(12) United States Patent
Stokking et al.

(10) Patent No.: US 9,553,756 B2
(45) Date of Patent: Jan. 24, 2017

(54) FINGERPRINT-BASED INTER-DESTINATION MEDIA SYNCHRONIZATION

(71) Applicants: Koninklijke KPN N.V., The Hague (NL); Nederlandse Organisatie voor Toegepast-Natuurwetenschappelijk Onderzoek TNO, Delft (NL)

(72) Inventors: Hans Maarten Stokking, Wateringen (NL); Ray van Brandenburg, The Hague (NL); Mattijs Oskar van Deventer, Leidschendam (NL)

(73) Assignees: Koninklijke KPN N.V., The Hague (NL); Nederlandse Organisatie voor Toegepast-Natuurwetenschappelijk TNO, Delft (NL)

( * ) Notice: Subject to any disclaimer, the term of this patent is extended or adjusted under 35 U.S.C. 154(b) by 349 days.

(21) Appl. No.: 13/905,133

(22) Filed: May 30, 2013

(65) Prior Publication Data

US 2013/0326082 A1 Dec. 5, 2013

(30) Foreign Application Priority Data

Jun. 1, 2012 (EP) .................................... 12170408

(51) Int. Cl.
*H04L 29/06* (2006.01)
*H04N 21/43* (2011.01)
(Continued)

(52) U.S. Cl.
CPC .... *H04L 29/06517* (2013.01); *H04N 21/4307* (2013.01); *H04N 21/4394* (2013.01); *H04N 21/44008* (2013.01); *H04N 21/6437* (2013.01)

(58) Field of Classification Search
CPC ....... H04N 7/24; H04N 7/52; G06F 17/30743; G06F 17/30758
See application file for complete search history.

(56) References Cited

U.S. PATENT DOCUMENTS 5,471,510 A * 11/1995 Renault ................ H04J 3/0632
370/517
5,485,553 A * 1/1996 Kovalick et al. ............ 358/1.6
(Continued)

FOREIGN PATENT DOCUMENTS

WO 2009/102582 8/2009
WO WO 2010/021966 A1 * 2/2010

OTHER PUBLICATIONS

Boronat, F., Lloret, J. and Garcia, M., "Multimedia group and inter-stream synchronization techniques: a comparative study", Information Systems, vol. 34 (2009), pp. 108-131.*
(Continued)

*Primary Examiner* — Jimmy H Tran
(74) *Attorney, Agent, or Firm* — McDonnell Boehnen Hulbert & Berghoff LLP

(57) ABSTRACT

Methods and systems for inter-destination synchronization in first and second receivers for content parts associated with a play-out timeline are disclosed. First timing information comprising first content part identifiers and associated first clock times may be determined, where the first receiver may receive a first content part identifier comprising first fingerprints for identifying a first content part in a first media stream. Second timing information comprising second content part identifiers and associated second clock times may be determined, where the second receiver may receive a second content part identifier identifying a second content part in a second media stream based on the first and second timing information. A timing difference in processing a content part in the first and second media streams may be calculated. Based on the timing difference, synchronization information for inter destination synchronization between said first and second streams may be generated.

20 Claims, 14 Drawing Sheets

(51) Int. Cl.
  *H04N 21/439* (2011.01)
  *H04N 21/44* (2011.01)
  *H04N 21/6437* (2011.01)

(56) References Cited

U.S. PATENT DOCUMENTS

| | | | | |
|---|---|---|---|---|
| 5,623,483 | A * | 4/1997 | Agrawal | H04J 3/0632 370/253 |
| 6,760,316 | B1 * | 7/2004 | Hebsgaard | H04J 3/067 370/324 |
| 7,084,898 | B1 * | 8/2006 | Firestone et al. | 348/14.09 |
| 7,289,451 | B2 * | 10/2007 | Bruhn | H04L 5/14 370/252 |
| 7,549,052 | B2 * | 6/2009 | Haitsma et al. | 713/180 |
| 7,680,063 | B2 * | 3/2010 | Bedekar | H04W 56/0045 370/252 |
| 7,680,153 | B2 * | 3/2010 | Ma | H04N 21/23406 370/503 |
| 7,693,130 | B2 * | 4/2010 | Barry | H04L 12/5692 370/229 |
| 7,711,008 | B2 * | 5/2010 | Jones | H04B 7/269 370/252 |
| 7,907,211 | B2 * | 3/2011 | Oostveen et al. | 348/515 |
| 7,992,177 | B2 * | 8/2011 | Perry | H04W 72/005 368/201 |
| 8,266,142 | B2 * | 9/2012 | Jiang | G06F 17/30743 707/725 |
| 8,358,376 | B2 * | 1/2013 | Oostveen | G10L 25/48 348/500 |
| 8,514,705 | B2 * | 8/2013 | Niamut | H04L 65/80 370/231 |
| 8,707,382 | B2 * | 4/2014 | Wollmershauser | H04N 21/242 725/133 |
| 8,839,340 | B2 * | 9/2014 | Van Deventer | H04L 65/605 370/508 |
| 8,931,025 | B2 * | 1/2015 | Stokking | G10H 1/365 725/115 |
| 9,066,235 | B2 * | 6/2015 | Ujiie | H04L 63/107 |
| 9,088,583 | B2 * | 7/2015 | Lotfallah | H04L 65/1016 |
| 9,161,074 | B2 * | 10/2015 | Khader | H04N 21/2668 |
| 9,237,179 | B2 * | 1/2016 | Stokking | H04L 65/80 |
| 2002/0120925 | A1 * | 8/2002 | Logan | A23L 1/3002 725/9 |
| 2003/0063627 | A1 * | 4/2003 | Toshitani | H04J 3/0632 370/503 |
| 2005/0157658 | A1 * | 7/2005 | Ishii | H04W 48/12 370/252 |
| 2006/0088023 | A1 * | 4/2006 | Muller | H04H 20/67 370/350 |
| 2006/0156374 | A1 * | 7/2006 | Hu | H04N 7/163 725/135 |
| 2006/0236352 | A1 * | 10/2006 | Scott, III | H04N 5/76 725/89 |
| 2007/0250901 | A1 * | 10/2007 | McIntire | H04N 7/17318 725/146 |
| 2008/0013614 | A1 * | 1/2008 | Fiesel et al. | 375/224 |
| 2008/0109529 | A1 * | 5/2008 | Story | 709/217 |
| 2008/0117937 | A1 * | 5/2008 | Firestone | H04N 5/4401 370/503 |
| 2008/0215704 | A1 * | 9/2008 | Curcio et al. | 709/217 |
| 2008/0247331 | A1 * | 10/2008 | Becker | H04L 43/0858 370/253 |
| 2008/0263620 | A1 * | 10/2008 | Berkvens | H04N 7/163 725/136 |
| 2009/0205008 | A1 * | 8/2009 | Wollmershauser | H04N 21/242 725/131 |
| 2009/0251599 | A1 | 10/2009 | Kashyap et al. | |
| 2009/0257455 | A1 * | 10/2009 | Sukkar | H04J 3/0664 370/503 |
| 2010/0005501 | A1 * | 1/2010 | Stokking | G10H 1/365 725/115 |
| 2010/0225810 | A1 * | 9/2010 | Berkvens | H04N 21/4307 348/500 |
| 2010/0257280 | A1 * | 10/2010 | Stokking | H04L 65/80 709/231 |
| 2010/0303100 | A1 * | 12/2010 | Niamut et al. | 370/503 |
| 2011/0119546 | A1 * | 5/2011 | Ver Steeg et al. | 714/748 |
| 2012/0036277 | A1 * | 2/2012 | Stokking | H04N 7/24 709/231 |
| 2012/0324520 | A1 * | 12/2012 | Van Deventer | H04L 65/605 725/109 |
| 2013/0219487 | A1 * | 8/2013 | Ujiie | H04L 63/107 726/16 |
| 2014/0365685 | A1 * | 12/2014 | Bangma | H04L 67/1095 709/248 |
| 2015/0052571 | A1 * | 2/2015 | Stokking | H04N 21/242 725/116 |
| 2016/0014171 | A1 * | 1/2016 | Liu | H04L 65/4007 709/217 |

OTHER PUBLICATIONS

Ramanathan, Srinivas, and P. Venkat Rangan. "Feedback techniques for intra-media continuity and inter-media synchronization in distributed multimedia systems." The Computer Journal 36.1 (1993): 19-31.*

Ishibashi, Yutaka, and Shuji Tasaka. "A group synchronization mechanism for live media in multicast communications." Global Telecommunications Conference, 1997. GLOBECOM'97., IEEE. vol. 2. IEEE, 1997.*

F. Boronat et al., "Multimedia Group and Inter-stream Synchronization Techniques: a Comparative Study", Information Systems, Mar. 2009, vol. 34, iss. 1, pp. 108-131, Elsevier B.V.

European Patent Office, Extended European Search Report for EP App. No. 12170408.4 dated Oct. 22, 2012.

European Telecommunications Standards Institute, "Telecommunications and Internet converged Services and Protocols for Advanced Networking (TISPAN); IPTV Architecture; IPTV functions supported by the IMS Subsystem", Mar. 2011, ETSI Technical Specification (TS) 182 027, Version 3.5.1, ETSI.

European Telecommunications Standards Institute, "Telecommunications and Internet converged Services and Protocols for Advanced Networking (TISPAN);IMS-based IPTV stage 3 specification", Mar. 2011, ETSI Technical Specification (TS) 183 063, Version 3.5.2, ETSI.

I. Vaishnavi et al., "From IPTV to Synchronous Shared Experiences Challenges in Design: Distributed Media Synchronization",Signal Processing: Image Communication, Aug. 2011, vol. 26, iss. 7, pp. 370-377, Elsevier B.V.

Baudry et al., "Adaptive Video Fingerprints for Accurate Temporal Registration," 2010 IEEE International Conference on Acoustics, Speech and Signal Processing (ICASSP), Mar. 14, 2010, pp. 1786-1789.

Haitsma et al., "A Highly Robust Audio Fingerprinting System," Proceedings of the 3rd International Conference on Music Information Retrieval (ISMIR), Oct. 13, 2002, pp. 107-115.

Hesselman et al., "Sharing Enriched Multimedia Experiences across Heterogeneous Network Infrastructures," IEEE communications Magazine, Jun. 2010, pp. 54-65.

Huang et al., "A Robust Scene-Change Detection Method for Video Segmentation," IEEE Transactions on Circuits and Systems for Video Technology, Dec. 2001, pp. 1281-1288, vol. 11, No. 12.

Kudrle, Sara, "Media Fingerprinting: Managing Content, Security and Quality," Apr. 12, 2010, Miranda Technologies, Grass Valley, California, pp. 1-12.

Kurth et al., "A Prototypical Service for Real-Time Access to Local Context-Based Music Information," Proceedings of the 5th International Conference on Music Information Retrieval (ISMIR), Oct. 10, 2004, pp. 1-4.

Lu, Jian, "Video Fingerprinting and Applications: a review," May 4, 2009, 31 pages, available via the internet at www.slideshare.net/jianlu/videofingerprintingspiemfs09d (last visited Aug. 24, 2016).

Schavemaker et al., "vdFP-Video Fingerprinting Technologies for Media and Security Applications; D1: Report on Existing Technologies," TNO, Feb. 9, 2010, pp. 1-42.

(56) References Cited

OTHER PUBLICATIONS

Waddell et al., "AudioNideo Synchronization Standards and Solutions a Status Report," Nov. 9, 2009, Advanced Television Systems Committee, pp. 1-38.

* cited by examiner

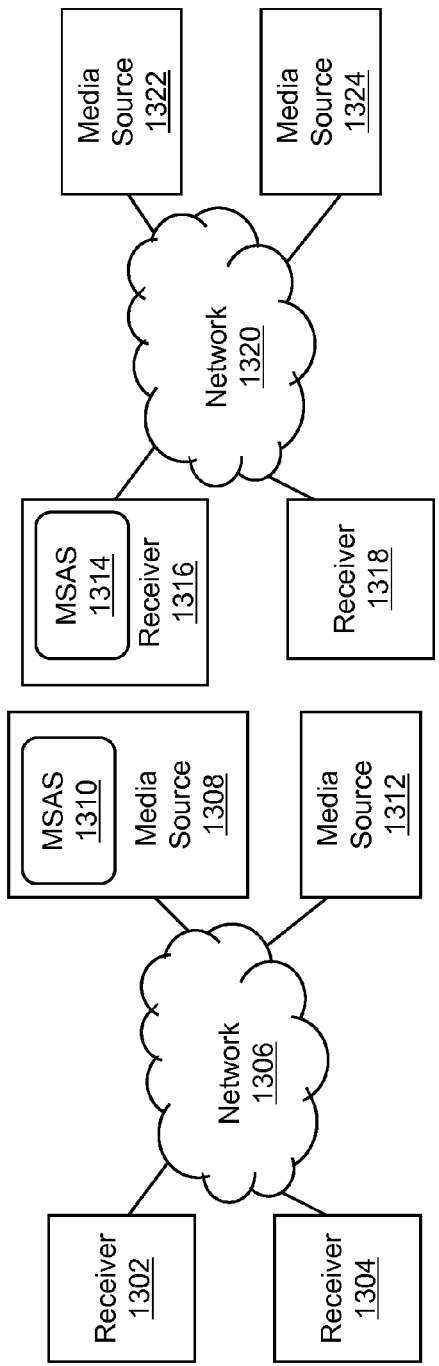
FIG. 13A
FIG. 13B
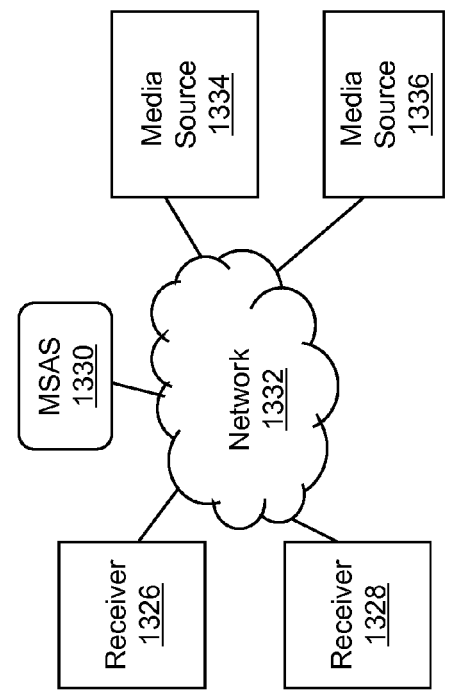
FIG. 13C

FINGERPRINT-BASED INTER-DESTINATION MEDIA SYNCHRONIZATION

CROSS-REFERENCE TO RELATED APPLICATIONS

This application claims priority under 35 U.S.C. §119 to European Patent Application EP 12170408.4, filed on Jun. 1, 2012, the contents of which are fully incorporated herein by reference for all purposes.

FIELD

The disclosure generally relates to inter-destination synchronization of media streams and, in particular, though not exclusively, to a system and a method for inter-destination synchronization of media streams, a inter-destination synchronization server, an inter-destination synchronization client and a data structure for use in such system and a computer program product for use in such method.

BACKGROUND

Multi-media techniques such as Voice over IP (VoIP) and Internet Protocol Television (IPTV) enable a large range of multi-media services. One type of multi-media service includes providing a synchronized shared experience for a plurality of users. Such synchronized multi-media services may be provided to a plurality of users, which are located at different locations. For example, a group of users may separately watch the same television channel and communicate with each other using text, audio and/or video (e.g., social TV). Other examples include timing-sensitive interactive experiences, such as a live auction, or a broadcasted television quiz program wherein viewers at home may input answers to broadcasted questions and participate in the show. Further, synchronized multi-media services may be provided to a plurality of different devices associated with one user. For example, a user may wish to watch the same television program on a handheld device in synchronization with a television at home, such that a user may switch from one device to another seamlessly back and forth.

In order to deliver the same content to different users, a content source may transmit streams via the network to a plurality of receivers for play-out. Due to, e.g., different end-to-end delays (due to different transmission delays, network delays and/or different content processing times at different receivers), a so-called Inter-Destination Media Synchronization (IDMS) or group synchronization system may be used to keep the play-out of content in the streams by the different receivers in sync. Examples of known IDMS systems are described in ETSI TISPAN documents TS 182 027 and 183 063, an article by I. Vaishnavi et al. "From IPTV to shared experiences challenges in design: Distributed media synchronization" (Elsevier Signal Processing: Image Communication 26 (2011) pp. 370-377) and an article by F. Boronat et al. "Multimedia group and inter-stream synchronization techniques: A comparative study" (Elsevier Information Systems 34 (2009) 108-131).

An IDMS system typically comprises synchronization clients at the receiver and a synchronization server in the network wherein the synchronization clients are configured to transmit timing information, e.g. a clock time indicating the time at which a predetermined packet in the stream was processed (e.g. received, decoded or played-out) by a receiver to the synchronization server. On the basis of the received timing information, the synchronization server is able to determine synchronization information, i.e. information for a receiver to delay or advance play-out of a stream. The synchronization information is transmitted to the receivers so that inter-destination synchronization of the receivers may be achieved.

Conventional IDMS systems are typically described in the context of simple, well-defined content delivery systems, e.g. a single content source transmitting a single stream using multicast to a plurality of receivers on the basis of a streaming protocol, e.g. the RTP/RTCP protocol. In such system, a particular content part, i.e. (part of) an image frame and/or one or more audio samples, is transmitted to the receivers on the basis of RTP packets having the same RTP time stamp. So, in such a system RTP packets received by different receivers, but with the same RTP time stamp relate to the same content part. Therefore, timing differences associated with the processing of the same content part by different receivers can be relatively easily determined.

In many content delivery systems however, such information for a straightforward determination of such timing differences is not available. For example, content may be delivered to different receivers using different protocols (e.g. a multicast RTP stream or an HTTP adaptive steaming (HAS) protocol), different compression formats, codecs, etc. Moreover, when streaming content to the receivers, the stream may be transcoded differently for different receivers or the content may be modified (by adding e.g. an advertisement to it), depending on the receiving end. Such modifications of one or more of the streams often leads to the disappearance of a common timeline amongst the streams, which however formed the basis for the synchronization determinations by most of the conventional IDMS systems.

Further, content may be delivered by multiple sources. For example, a content delivery network (CDN) may use various different delivery nodes (media server) for delivering a media broadcast to a plurality of receivers. In such case, a first RTP stream delivered from a first delivery node will have a random initial RTP timestamp value (random RTP timestamp Offset), which differs from a random initial RTP timestamp value from a second RTP stream delivered from a second deliver node, although the content and the moment that the content is transmitted may be the same for both nodes. In such case RTP packets having the same RTP time stamp, but which are transmitted by different delivery nodes, no longer correspond to the same content part of a content stream.

In all of the above cases, a conventional IDMS system is no longer able to determine the information used for synchronization of content play-out. Hence, there is a need in the art for an improved inter-destination media synchronization solution that alleviates at least one of the problems discussed above.

SUMMARY

In a first aspect, a method may be provided for enabling inter-destination synchronization of processing content parts in a first and second receiver wherein content parts may be associated with a predetermined play-out timeline and wherein said method may comprise: determining first timing information comprising one or more first content part identifiers and associated first clock times, a first content part identifier comprising one or more first fingerprints for identifying a first content part in a first media stream provided to said first receiver; determining second timing information comprising one or more second content part identifiers and associated second clock times, a second content part identifier identifying a second content part in a second media stream provided to said second receiver; on the basis of said first and second timing information, calculating a timing difference in the processing of a content part in said first and second media stream, wherein calculating said timing difference comprises matching at least one of said one or more first fingerprints with reference information comprising one or more reference fingerprints associated with reference positions on said play-out timeline; and, on the basis of said timing difference, generating synchronization information for enabling adjustment of the processing of said first and/or second streams so that inter destination synchronization between said first and second stream is achieved.

Hence, by using fingerprints of content parts in a content stream, inter-destination media synchronization is possible for situations where the temporal relation between different streams associated with the same content is not known. Such situation may occur when for instance the same content is streamed to different receivers via different streams, whereby at least one of the streams is based on a different streaming protocol (than the other streams). Alternatively such situation may occur if a streaming protocol is configured differently for different streams (for instance in the case of RTP, wherein different RTP random offset are used for different streams). Furthermore such situation may occur if the content in one of the streams is modified (for instance transcoded, compressed, etc.). As long as the streams deliver the same media content (even from different sources), the fingerprints may identify content parts in the synchronization status information and thus enable a synchronization server to perform synchronization calculations.

In one embodiment, at least part of said adjustment may be managed by a first synchronization client in said first receiver and/or second synchronization client in said second receiver. In another embodiment, at least part of said adjustment may be managed by a first synchronization client in a first media source transmitting said first stream to said first receiver and/or by a second synchronization client a second media source transmitting said second media stream to said second receiver. The adjustment of the processing of content parts may thus be achieved at the source or at the terminal (receiver) side.

In an embodiment the one or more second content part identifiers may be defined in accordance with a protocol, preferably a transport or streaming protocol, used for providing said second content parts to said second receiver.

In another embodiment, said one or more second content part identifiers comprise one or more second fingerprints and wherein calculating said timing difference further comprises matching at least one of said one or more second fingerprints with said one or more reference fingerprints in said reference information.

The claimed fingerprint-based solution thus provides the advantage that it is not or at least less dependent on the type of protocol used to deliver the content to a receiver (e.g. which transport protocol, codecs, transport mechanisms, etc. are used). Accordingly, the fingerprint-based IDMS system is suitable for use with the frequently used HTTP Adaptive Streaming (HAS) protocol and/or in multi-source content distribution schemes such as a CDN.

Although a CDN may distribute the content over various nodes, store content at these nodes in different formats, and/or change RTP timestamps during the distribution to receivers, fingerprint-based IDMS is still possible, since it does not rely on metadata in the streams in any way. Furthermore the claimed solution may even work when various (CDN) providers provide the same content to their customers via different streaming methods. In such situation, the claimed solution is not dependent on the co-operation of these providers (or on information provided by their respective streaming nodes). Advantageously the claimed solution may be provided as a third party service.

In one embodiment said first and/or second clock time may indicate a time at which said first and/or second content part is processed by said first and/or second receiver. In another embodiment, said processing may be associated with at least one of: receiving, buffering, decoding or play-out. In yet another embodiment, said first and second clock time may be a synchronized NTP clock time.

In an embodiment said first and second timing information may be transmitted by said first and second synchronization client to a synchronization server. In another embodiment, said synchronization function in said synchronization server may be configured to generate said synchronization information and transmit said synchronization information to said first and/or second synchronization client.

In a further embodiment least part of said one or more second content part identifiers and associated second clock times may be used as reference information. This embodiment allows the fingerprint-matching algorithm to be implemented in a receiver.

In a further embodiment, said method may comprise: generating one or more second fingerprints on the basis of one or more content parts in said second media stream; generating one or more clock times associated with said one or more second fingerprints, a second clock time indicating a time at which a second content part is processed by said second receiver; storing at least part of said one or more second fingerprints and one or more second clock times as reference information in a reference database in said second receiver.

In yet a further embodiment, said method may comprise: said first synchronization client in said first receiver transmitting said first timing information to a synchronization server; said synchronization server transmitting a request for a clock time to said second synchronization client, said request comprising at least one of said one or more first fingerprints; said second synchronization client transmitting a response to said synchronization server, said response comprising a second clock time associated with a reference fingerprint which matches said first fingerprint to said synchronization server; said synchronization server determining a timing difference in the processing of a content part in said first and second media stream on the basis of said first and second clock time.

In an embodiment said first and/or second timing information may be generated upon reception of a trigger signal in one or more content parts provided in said first and second media streams to said first and second receiver, preferably said trigger signal being generated a scene change algorithm configured for detecting a predetermined change between a first scene in a first content part and a second scene in a second content part.

In an embodiment said first and/or second timing information may be generated upon reception of a trigger signal in one or more content parts provided in said first and second media streams to said first and second receiver. In another embodiment, said trigger signal may be generated by a scene change algorithm configured for detecting a predetermined change between a first scene in a first content part and a second scene in a second content part. This embodiment provides the advantage that the synchronization clients are able to report on the same content part without having to report on substantially all (other) content parts (e.g. video frames and/or audio samples) of the content; and/or, without the need to agree on which content parts should be reported on.

In an embodiment said matching may comprise: comparing a first sequence of binary values associated with at least part of one of said first fingerprints with sequences of binary values associated with said one or more reference fingerprints.

In an embodiment said first and second media stream differ from each other by at least one of: a video and/or audio codec; a streaming and/or transport protocol, a video and/or audio format.

In an embodiment said first timing information, preferably said first timestamp and/or said first fingerprint may be transmitted in an RTCP synchronization status report. In another embodiment said RTCP synchronization status report may be extended with an RTCP extended report (XR) block comprising at least part of a fingerprint.

In an embodiment said first timestamp and said first fingerprint may relate to an RTP packet as identified in said RTCP XR block. In an embodiment said RTCP XR block may comprise one or more parameters for identifying at least one fingerprint type, preferably an audio, video and/or text fingerprint, and/or a fingerprint algorithm type.

In a further aspect, an embodiment may relate to an inter-destination synchronization client for use in a receiver configured to process and play-out content parts in a media stream, wherein said synchronization client may be configured for: determining timing information comprising one or more first content part identifiers and associated first clock times, a first content part identifier comprising one or more first fingerprints for identifying one or more first content parts in said first media stream; and, receiving synchronization information for adjusting said play-out of said content parts. In one embodiment, the client may be implemented as a computer-implemented method executed in a receiver.

In another aspect, an embodiment may relate to a receiver configured to process and play-out content parts in a media stream comprising an inter-destination client as described above, wherein said receiver may further comprise: a fingerprint generator for generating one or more fingerprints on the basis of at least part of one or more content parts in said media stream; a storage storing at least part of said one or more fingerprints.

In an embodiment, said receiver may comprise: a clock, preferably an NTP clock, for generating a clock time associated with the processing by said receiver of at least one content part in said media stream; an communication interface for transmitting timing information to a synchronization server and for receiving synchronization information from said synchronization server.

In yet another aspect, an embodiment may relate to a synchronization server configured for: receiving first timing information comprising one or more first content part identifiers and associated first clock times, a first content part identifier comprising one or more first fingerprints for identifying a first content part in a first media stream provided to a first receiver; receiving second timing information comprising one or more second content part identifiers and associated second clock times, a second content part identifier identifying a second content part in a second media stream provided to said second receiver; on the basis of said first and second timing information, calculating a timing difference in the processing of a content part in said first and second media stream, wherein calculating said timing difference comprises matching at least one of said one or more first fingerprints with reference information comprising one or more reference fingerprints associated with reference positions on said play-out timeline; and, on the basis of said timing difference, generating synchronization information for enabling adjustment of the processing of said first and/or second streams so that inter-destination synchronization between said first and second stream is achieved.

In one aspect, an embodiment may relate to a data structure, preferably an RTCP extended report, for use with a client as described above, said data structure comprising: one or more content part identifiers and associated clock times, wherein at least one of said one or more content part identifiers comprise one or more first fingerprints for identifying one or more first content parts in a media stream.

In an embodiment said data structure may comprise: one or more parameters for identifying the type of fingerprint, preferably an audio, video and/or text fingerprint; and/or for identifying the type of fingerprint algorithm.

An embodiment may also relate to a computer program product, implemented on computer-readable non-transitory storage medium, the computer program product configured for, when run on a computer, executing the method steps as described above.

The disclosed embodiments will be further illustrated with reference to the attached drawings, which schematically show embodiments. It will be understood that the disclosure is not in any way restricted to these specific embodiments.

BRIEF DESCRIPTION OF THE DRAWINGS

Aspects of the disclosure will be explained in greater detail by reference to exemplary embodiments shown in the drawings, in which:

FIGS. 13A-13C depicts schematic IDMS systems, according to various embodiments of the disclosure.

DETAILED DESCRIPTION

Figure 1:
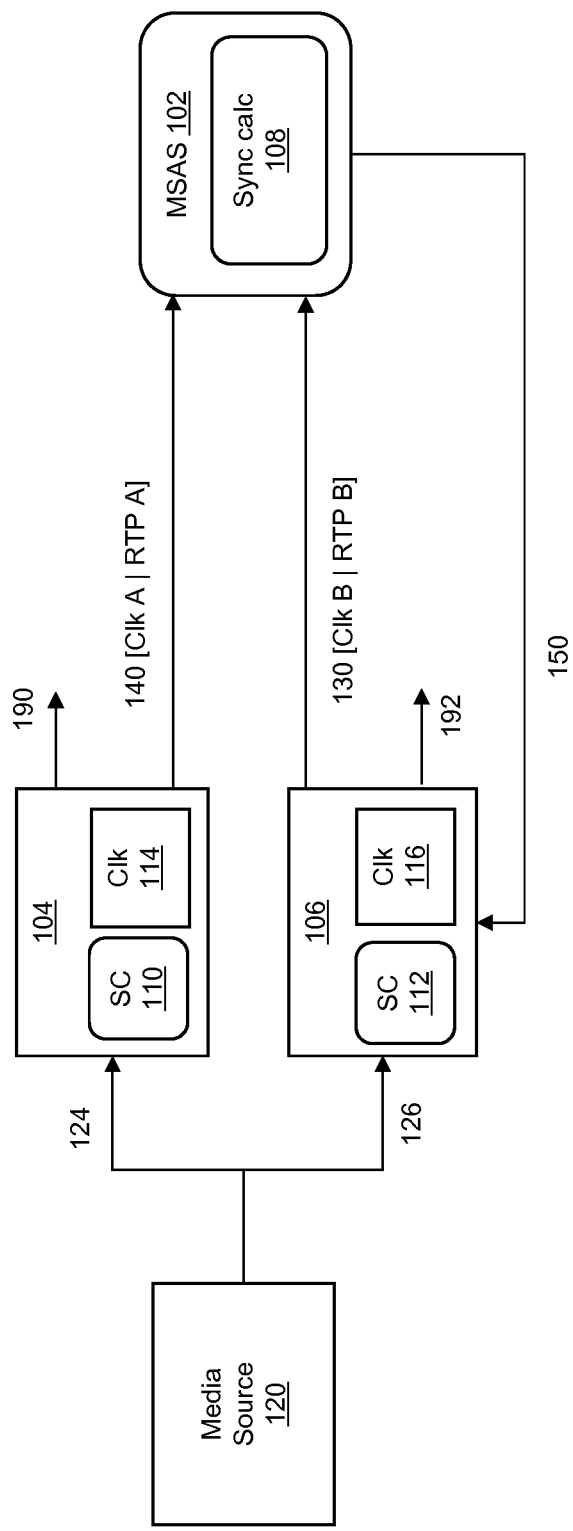
FIG. 1 depicts a conventional IDMS system.

FIG. 1 shows a conventional IDMS system for synchronizing the play-out of streams transmitted to a plurality of receivers. In this particular example, a media source 120 is configured to transmit (e.g. multicast), at least two streams, a first stream 124 and a second stream 126 to a first receiver 104 and second receiver 106 respectively. In this particular example, the media source may be configured to deliver content to the receivers on the basis of multicast streaming and the RTP protocol. Each receiver may comprise a synchronization client 110,112, which is configured to transmit timing information to a media synchronization application server (MSAS) 102, (in short a synchronization server).

Here, timing information may comprise a clock time and a content part identifier. The clock time (e.g. a NTP time stamp) may indicate the time at which a particular content part identified e.g. by a RTP time stamp in a stream was processed (e.g. received, decoded or played-out) by a receiver. This way, timing information may be used by the MSAS to determine the position of a content part on the play-out time-line of a linear content stream.

FIG. 1 depicts the transmission of timing information comprising a clock time ("Clk A" and "Clk B") generated by, e.g. an NTP synchronized clock in the receivers and an RTP timestamp ("RTP timestamp A" and "RTP timestamp B") of an RTP packet that a receiver had received. The clock time generated by a synchronized clock 110,114 in a receiver may indicate at which time a content part, e.g., (part of) an image frame and/or one or more audio samples, associated with an RTP timestamp was processed by the receiver. RTP timestamps are used to identify a particular position of a content part (comprised of for example one or more RTP packets) on the content (play-out) time line of content comprised in the stream, so that a synchronization function 180 in the MSAS is able to calculate a timing difference, e.g. a timing difference in the processing (such as receipt, play-out or presentation) of a particular content part in said first and second media stream, on the basis of the information in the received reports.

For example, the first receiver may report the reception of a frame (a content part formed by one or more RTP packets with the same RTP timestamp) associated with RTP timestamp 2070000 (RTP_RCVR1_reported) at clock time 01:23:45.678 (NTP_RCVR1); and, the second receiver may report the reception of a frame associated with RTP timestamp 2250000 (RTP_RCVR2_reported) at clock time 01:23:46.678 (NTP_RCVR2).

When the MSAS is provided with an RTP timestamp clock frequency, e.g. 90000 Hz, the MSAS may first determine the most delayed receiver by selecting, e.g. a reference timestamp, and subsequent calculation of the other timestamps using the reference timestamp as a basis. For example, the MSAS may select the clock time of the first receiver and calculate the RTP timestamp of the second receiver at this clock time: RTP_RCVR2_calculated=RTP_RCVR2_reported+90000*(NTP_RCVR1−NTP_RCVR2). The result of this calculation is RTP_RCVR2_calculated=2160000, indicating that the first receiver is the most delayed receiver. In other words, at the time NTP_RCVR1, the RTP timestamp value of the second receiver is larger than the one associated with first receiver.

In order to achieve inter-destination synchronization, the first and/or second receiver has to adjust the play-out at the output 190,192 using e.g. a variable delay buffer (not shown). This adjustment is realized on the basis of synchronization information 150, which is transmitted to a receiver (e.g., the second receiver) for adjusting its play-out. Hence, in this conventional system, RTP timestamps are used to identify the position of one or more particular RTP PACK-ETS (carrying a predetermined content part) on the content (play-out) time line of content transmitted in an RTP stream. RTP packets with the same RTP time stamp (for instance forming together a frame) are thus indicated has having the same position in the content (play-out) time line of content transmitted via a stream. Individual RTP packets may also be identified by their unique RTP sequence numbers. Such number however does not indicate how these RTP packets are positioned in the play-out of the content. RTP packets with different sequence numbers, but with the same RTP time stamp are destined to be played-out simultaneously.

As explained above with regard to RTP, generally, protocols for streaming linear content to a client use timing information in the form of a sequence of values that (linearly) increases in order to define the play-out ordering in time of predetermined content parts such as video frames and/or audio samples in a packetized stream. Examples of such protocol-defined timing information may include: a RTP timestamp, a presentation timestamp used in MPEG format, a play-back position (e.g. SMPTE time code or normal play time) used in Real Time Streaming Protocol (RTSP, see IETF RFC 2326), or one or more equivalent protocol parameters in or associated with the packets in the stream. Timing information thus defines play-out or presentation positions of a predetermined content part (such as a frame formed by one or more RTP packets) in a stream delivered to the receiver.

One problem with respect to a conventional IDMS system as depicted in FIG. 1 is that the same timing information needs to be used for all transmitted streams and should not be modified during transmission. For example, when using NTP clock times and RTP timestamps as sequence information, all streams should start with the same initial RTP timestamp value and the RTP timestamps may not be lost or altered during transmission.

In many situations however this is not the case. For example, if a media source sends different streams to different receivers using the RTP protocol, the media source should use different (random) initial RTP timestamp values for the different streams to that—without prior knowledge of the initial RTP timestamps—the temporal relation between the different streams is lost. This may be the case when a single source sends a separate unicast to each receiver, or sends out different multicast streams to various receivers. Similar problems arise in systems using different transport protocols and/or different codec's or—in the case of a content delivery system (CDN)—using a plurality of nodes or sources to delivery content to different receivers.

Further, in many situations the timing information associated with streams is modified during transmission. For instance, transformation of one of the streams by a transcoder, or modification of the content carried by one of the streams (e.g. an insertion of further content such as an advertisement), may destroy the initially existing temporal relationship between the streams. Therefore, in all of the above-mentioned situations a conventional IDMS system as described with reference to FIG. 1 is not able or at least less suitable to synchronize the play-out of the streams by the different receivers.

Figure 2A:
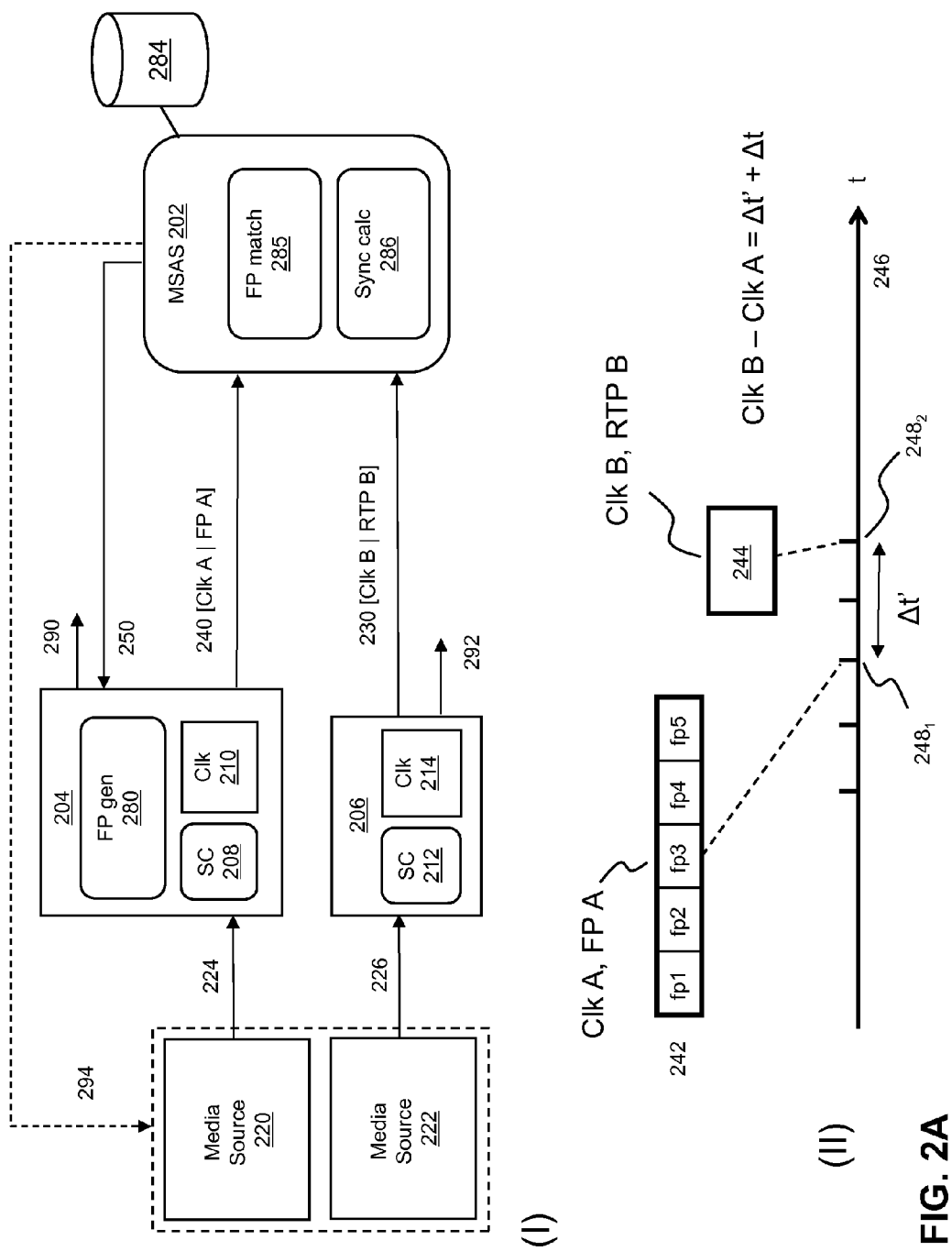
FIGS. 2A and 2B depict a fingerprint-based inter-destination media synchronization system according to various embodiments of the disclosure.
Figure 2B:
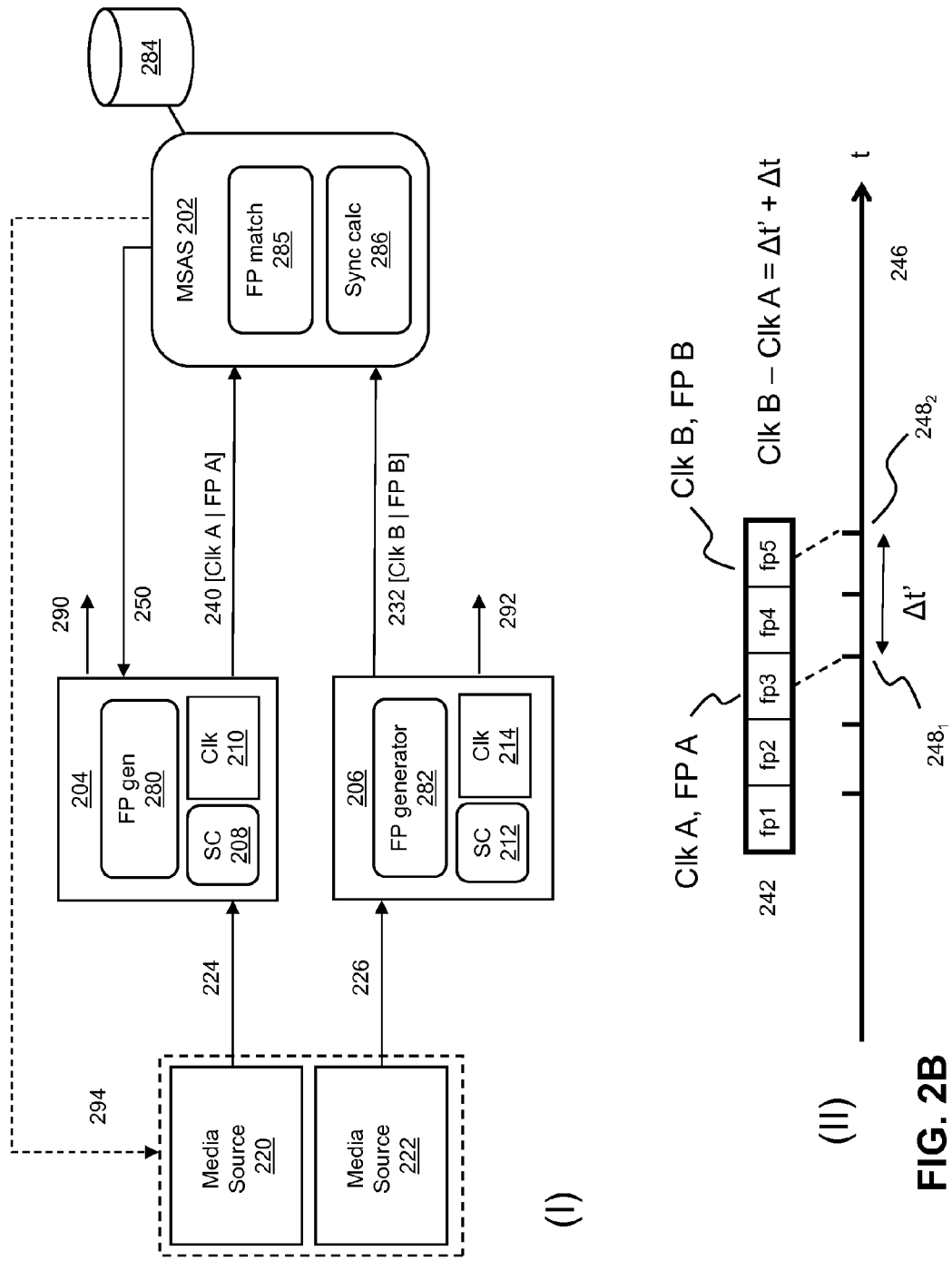

FIGS. 2A and 2B depict exemplary fingerprint-based inter-destination media synchronization systems (IDMS), according to various embodiments of the disclosure. In particular, FIG. 2A (I) depicts an IDMS system comprising one or more media sources (e.g., a first media source 220 and a second media source 222), a plurality of receivers, e.g. a first receiver 204 and a second receiver 206, and at least one media synchronization application server (MSAS) 202. The first and second receivers may be (part of) media output devices or systems (e.g., mobile media consumption devices, home electronic media devices, computer systems, etc.) in geographically separate locations or different types of media output devices or systems at one location.

The MSAS may comprise a fingerprint-matching algorithm 285 coupled to a fingerprint storage medium, e.g. a fingerprint database 284, and a synchronization algorithm 286. The first media source and the second media source may be configured to transmit the same (or substantially similar) content in a plurality of streams, e.g. a first stream 224 and a second stream 226, to the first and the second receiver, respectively. The first and second receiver may be equipped with a synchronization client 208,212, which is configured to generate and transmit timing information 230,240 to the MSAS. The timing information may comprise a clock time and a content part identifier, which may be transmitted in the form of a predetermined data structure, a synchronization report, to the MSAS.

In this particular embodiment, the second synchronization client may transmit timing information in the form of a clock time and a content part identifier defined in accordance with a protocol, e.g. a transport or streaming protocol, which is used to transmit the second media stream to the second receiver. For example, an RTP time stamp may be used as a protocol-based content part identifier in case the RTP-protocol is used (e.g. described with reference to FIG. 1). In contrast, the first synchronization client may transmit timing information in the form of a clock time and a content part identifier comprising a fingerprint. To that end, the first receiver may comprise a fingerprint generator 280, which is configured to produce a substantially unique fingerprint of a content part in the first media stream. As will be described hereunder in more detail, such fingerprint may be used to identify the position of a particular content part on the play-out timeline of the content. Here, a substantially unique fingerprint refers to a fingerprint, which is unique for a sequence of content parts in a stream of a predetermined length. For example, in one embodiment, a fingerprint may be unique over a period, which is approximately similar to the maximum expected delay between the streams.

The fingerprint generator 280 may generate a fingerprint using a well-known fingerprinting algorithm, which may extract and compress characteristic components of (part of, or a sequence of) a video frame or audio sample into a condensed digital data structure, which can be used to uniquely identify (part of, or a sequence of) a video frame or audio sample. In one embodiment, Rabin's algorithm may be used to calculate a fingerprint, e.g. a string of bits of a predetermined length. In another embodiment, a known cryptographic hash function such as SHA may be used to in order to generate a hashing value associated with a content part, e.g. a hashing value associated with part of an image frame. This hashing value may then be used as a fingerprint for identifying the content part. In yet another embodiment, a fingerprint may be calculated by determining differences, e.g. luminance differences, between two portions in an image frame. Depending on the outcome of the differences in the luminance, a bit may be set to 0 or 1. This way a sequence of bits may be generated which may uniquely identify a content part.

Video fingerprinting analysis may be based on any number of visual video features including, but not limited to, key frame analysis and/or color and motion changes during a video sequence. The size of the video fingerprint may be substantially smaller, e.g. 5%-1% (or less) of the original bit rate of the video. In case of audio samples, a robust acoustic fingerprint algorithm may be selected which is able to take into account the perceptual characteristics of the audio. In that case, if two files sound alike to the human ear, their acoustic fingerprints should match, even if their binary representations are quite different. The size of the audio fingerprint may be in the order of several tens of bytes per second to several hundreds of bytes per second, depending on the fingerprint generation algorithm.

For a more detailed description of such techniques reference is made to Jian Lu, "Video Fingerprinting and Applications: a review", Media Forensics & Security Conference EI'09, San Jose, Calif.; J. Haitsma and T. Kalker, "A highly robust audio fingerprinting system with an efficient search strategy", Journal of New Music Research, 32(2), 2003 and Chung-Lin Huang et al, "A Robust Scene-Change Detection Method for Video Segmentation", IEEE transaction on circuits and systems for video technology, Vol. 11, No. 12, December 2001.

The first and second synchronization client may generate a first and second clock time on the basis of a synchronized wall clock (e.g., first and second clock 210, 214) in the receiver, wherein a clock time indicates at what time a content part identified by a content part identifier is processed (e.g. received, decoded or played-out) by the receiver. Associating a clock time to a fingerprint may also be referred to as timestamping a fingerprint. In some embodiments, the timing information may be transmitted in a predetermined data structure format, e.g. synchronization status report as described in ETSI TISPAN TS 183 063 V3.5.2 or IETF ID draft-ietf-avtcore-idms-02.

The wall clocks in the different receivers may be synchronized using, e.g., the Network Time Protocol (NTP). In some embodiments synchronized clocks are not used. For example, if a low-delay communication channel is used for transmitting the timing information to the MSAS, the arrival time of a fingerprint at the MSAS may be used. Here, a low-delay communication channel may be defined as a communication channel which allows transmission between the receiver and the MSAS within a transmission time which is substantially smaller than the desired level of synchronization (see hereunder for a more detailed description). For example, when a low level of synchronization levels is desired (asynchronies between 500-2000 ms), a low-delay communication channel of a transmission time of less than 500 nm is sufficient.

Hence, in such an embodiment the timing information sent to the MSAS only comprises a fingerprint and no clock time, so that no synchronized wall clock is used by the client. Upon reception of the fingerprint, the MSAS associates the fingerprint with a clock time (arrival time). In this particular embodiment, the clients will send the timing information immediately upon reception (or play-back) of content parts that are reported on. Another alternative may include determining/estimating network delays that status reports suffer when traveling the network from one entity to another.

When the MSAS receives timing information comprising a fingerprint, it may execute the fingerprint-matching algorithm. The outcome of the matching process is then used by the synchronization algorithm to determine a timing difference associated with processing (e.g. reception, decoding and/or playout) a content part in the first receiver and the second receiver. In order to match fingerprints, in one embodiment, the MSAS may be configured to query a reference database 284 comprising reference information. The reference information may comprise one or more reference fingerprints so that fingerprints in the timing information can be matched with reference fingerprints. The data forming the reference information, including the reference fingerprints, may be arranged or ordered in accordance with the play-out timeline of the content.

As depicted in FIG. 2A (II) reference information may include one or more reference fingerprints 242, which are arranged in accordance with a predetermined play-out timeline 246 which is common to the content provided to the first and second receiver. Here, the play-out timeline may determine the time at which particular content part is processed by a receiver so that the content part can be played-out by the receiver. The MSAS may relate part of the first timing information (a fingerprint FPA) associated with a first content part in the first media stream with a first play-out time corresponding to a first position $248_1$ on the play-out timeline by matching the fingerprint to a reference fingerprint (in this case fp3). The fingerprint-matching process may be executed by a fingerprint algorithm 285 in the MSAS.

The reference information may further comprise RTP reference information 244 for determining the location of a RTP-based content part on the play-out timeline of the content. RTP reference information may include an RTP time offset and the RTP sampling frequency. On the basis of this information, the MSAS may determine the location of a content part associated with a RTP time stamp on the content playout time line in a similar was described with reference to FIG. 1. Hence, using the RTP reference information, the MSAS may relate the second timing information (an RTP timestamp RTP B and a second clock time Clk B) associated with second content part in a RTP-based second media stream with a second play-out time corresponding to a second position $248_2$ on the play-out timeline. The reference information may be stored in accordance to known database structures such that fast matching and retrieval of the relevant information is ensured.

Then, on the basis of the first and second position, a synchronization algorithm 286 in the MSAS may determine that the difference in play-out time between the first and second content part is $\Delta t'$. This play-out time difference is caused by the fact that in this case first and second timing information report on two different content parts.

Hence, in order to align the processing of the same content part in the first and second media stream, the synchronization algorithm may determine a timing difference $\Delta t$ on the basis of the clock times and the play-out time difference $\Delta t'$: $Clk\_B - Clk\_A = \Delta t' + \Delta t$, wherein $\Delta t'$ and $\Delta t$ may have a positive or negative value depending on the reported situation. Note that in case first and second timing information report on the same content part $\Delta t'=0$, so that the timing difference is simply given by $Clk\_B - Clk\_A$.

The synchronization algorithm may use the timing difference to determine synchronization information 250, which is sent back to at least one of the receivers, in particular the synchronization client of at least one of the receiver, so that the play-out can be adjusted (e.g. delay the play-out by instructing a variable delay buffer) in order to substantially synchronize the processing, preferably the play-out at the output of the first and second receiver 290,292, of content parts in the first and second receiver.

In another embodiment, the MSAS may send synchronization information 294 to at least one of the media sources 222,200. On the basis of the synchronization information a source may adjust the transmission of a stream to a receiver so that synchronized processing of content parts is achieved. In yet another embodiment, the MSAS may transmit synchronization information both to at least one of the sources and a receiver.

Hence, the reference information stored in the reference database may comprise a time-ordered sequence of fingerprints wherein each fingerprint is associated with a content part, which needs to be processed, e.g. decoded or played-out, according to a particular play-out timeline. Hence, in this particular embodiment, the MSAS may have access to fingerprints of the entire, or at least a substantial part of the entire content for the duration that synchronization is desired. The access to the fingerprints may be achieved in various ways.

In one embodiment, the reference database may be supplied as a predetermined reference file of fingerprints, which may be supplied by a content provider associated with a media source. In another embodiment, the MSAS may receive content a content file or content stream from a media source and generate the reference fingerprints using a fingerprint generator. In a further embodiment, the MSAS may receive fingerprints from a receiver comprising a fingerprint generator, which is configured to provide the MSAS with fingerprints of the content parts received by the receiver. In order to further improve the efficiency of generating reference information, the MSAS may be co-located with a media source or a receiver.

In order to achieve high synchronization accuracy, the fingerprinting process may be performed on content parts of short lengths, e.g. a video frame or audio sample. Reducing the length of the data for which a fingerprint is calculated may give rise to less unique fingerprints. This problem may be solved or at least reduced by limiting the search space around the fingerprint (e.g. plus and minus one minute of the play-out time of the fingerprint). Furthermore, in one embodiment, more salient fingerprints may be produced by incorporating image features that are unique for that image.

In this disclosure synchronization may be achieved at various accuracies depending on the application. A very high synchronization level relates to asynchronies lower than 10 ms. Such a level of synchronization can be used for different audio or video outputs located at a single physical location. Typical applications relate to networked stereo loudspeakers, phased array transducers and video walls.

High synchronization levels relate to asynchronies between 10-100 ms. Such levels of synchronization can be used by applications wherein fairness is an important requirement, wherein the response times of the users should not be influenced too much by delay differences of media play-out to which users respond. Typical applications relate to: distributed tele-orchestra, networked quiz shows, networked real-time multiplayer games, multiparty multimedia conferencing, and game-show participation. Medium synchronization levels relate to asynchronies between 100-500 ms. Such levels of synchronization can be used by applications wherein various related media items are displayed simultaneously but without real-time requirements, such as lip-sync. Typical applications relate to: synchronous e-learning, presence-based games, consumer-originated content, on-line election events and second screen sync. Finally, low synchronization levels relate to asynchronies between 500-2000 ms. Such levels of synchronization can be sufficient for applications wherein media is consumed by different users at different physical location, but the nature of the interaction level between users is not of very competitive nature. Example applications relate to seamless switching among media devices, shared service control and social TV.

In a further embodiment, the fingerprint generator associated with the synchronization client may be configured to generate timestamped fingerprints upon a trigger signal. Such trigger signal may be sent upon the detection of a particular scene change in the video frames. In another embodiment, the synchronization client may receive a trigger signal from an external source.

FIG. 2B (I) depicts a fingerprint-based IDMS system according to an embodiment of the disclosure. In this particular embodiment, the synchronization clients in the receivers report timing information to the MSAS in a similar way as described with reference to FIG. 2A (I). In this example however, both the first and second synchronization client 204,206, comprise a fingerprint generator 280,282 for generating fingerprints of content parts in a received media stream 224,226. Hence, in this embodiment, the synchronization clients report the time at which a particular content part is processed by: generating a fingerprint of at least part of a content part that is processed by the receiver; associating a clock time with the content part; and, sending the fingerprint and the clock time as timing information 240,232 to the MSAS.

As illustrated in FIG. 2B (II), reference information in the reference database may comprise one or more reference fingerprints 242, which are arranged in accordance with a predetermined play-out timeline 246, which is common to the content provided to the first and second receiver. The play-out timeline may determine the time at which a content part is processed by a receiver so that the content part can be played-out by the receiver. Because all or at least a large part of the receivers report fingerprints to the MSAS, a fingerprint-matching algorithm 285 may match both the first reported fingerprint FPA and the second reported fingerprint FP B to the reference fingerprints.

When a match is found, the first and second matched reference fingerprints (fp3 and fp5 in FIG. 2B(II)) determine a first play-out time corresponding to a first position $248_1$ on the play-out timeline 246 of the content and second play-out time corresponding to a second position $248_2$ on the play-out timeline 246 of the content, wherein the two positions may determine a play-out difference Δt'. A synchronization algorithm 286 may determine a timing difference Δt on the basis of the clock times in the first and second timing information and the play-out difference Δt': Clk_B−Clk_A=Δt'+Δt, in a similar way as described with reference to FIG. 2A (I). The synchronization algorithm may subsequently use the timing difference to determine synchronization information 250, which is sent back to at least one of the receivers so that it can adjust its play-out at the output 290,292 in order to achieve synchronization.

In another embodiment, the MSAS may send synchronization information 294 to at least one of the media sources 222,200. On the basis of the synchronization information, a source may adjust the transmission of a stream to a receiver so that synchronized processing of content parts is achieved. In yet another embodiment, the MSAS may transmit synchronization information both to at least one of the sources and a receiver.

The use of fingerprints enables inter-destination media synchronization in situations where the same or substantially similar content is delivered to different receivers using different protocols, content formats and/or technology platforms. Here, substantially similar content implies that small differences in the content may exist, e.g. quality, color, 2D/3D formats. As long as the streams deliver such media content (even from different sources), the fingerprints may identify content parts in the media streams so that the MSAS is able to generate synchronization information.

In contrast with a conventional IDMS system described with reference to FIG. 1, the fingerprint-based IDMS system as depicted in FIG. 2A may synchronize media streams which differ in terms of video and/or audio compression codec, video resolution and/or quality. Further, the media streams may be sent to the receivers using different protocols (e.g. RTP, HAS, etc.) and different underlying network technologies (e.g. using IP, using DVB broadcasting technologies such as DVB-C, DVB-H). Accordingly, the fingerprint-based IDMS system is suitable for use with the frequently used HTTP Adaptive Streaming (HAS) protocol and/or in multi-source content distribution schemes such as a CDN. Although a CDN may distribute the content over various nodes, store content at these nodes in different formats, and/or change timestamps during the distribution to receivers, fingerprint-based IDMS is still possible, since it does not rely on metadata in the streams in any way.

A further advantage of using fingerprints is that conventional protocol-based timing information e.g. RTP-time stamps or RTP sequence numbers and an NTP clock time cannot always guarantee a reliable timeline. As already explained above, in some cases timestamps or sequence numbers may not increment monotonously (e.g. per RTP packet received) as assumed. For instance, RTP packets may not be received in order of the RTP timestamps or multiple RTP packets may have the same RTP timestamp (e.g. if the RTP packets (logically) belong to the same video frame). Moreover, consecutive RTP packets may include timestamps that are not monotonic if the data are not transmitted in the order the data were sampled. This is for example the case of MPEG interpolated video frames. Such discrepancies do not allow accurate inter-destination synchronization amongst different streams. However, by using fingerprints instead of RTP timestamps, the problems with RTP timestamps are eschewed.

The synchronization (sync) client in the receiver may be implemented at least partially as a software program and/or as one or more hardware modules configured to execute functions responsible for transmission of timing information and receiving and executing synchronization instructions. Similarly, the MSAS may comprise server (software) functions and/or hardware component(s) configured to collect and process timing information and to calculate and transmit synchronization information to a synchronization client in a receiver.

Figure 3:
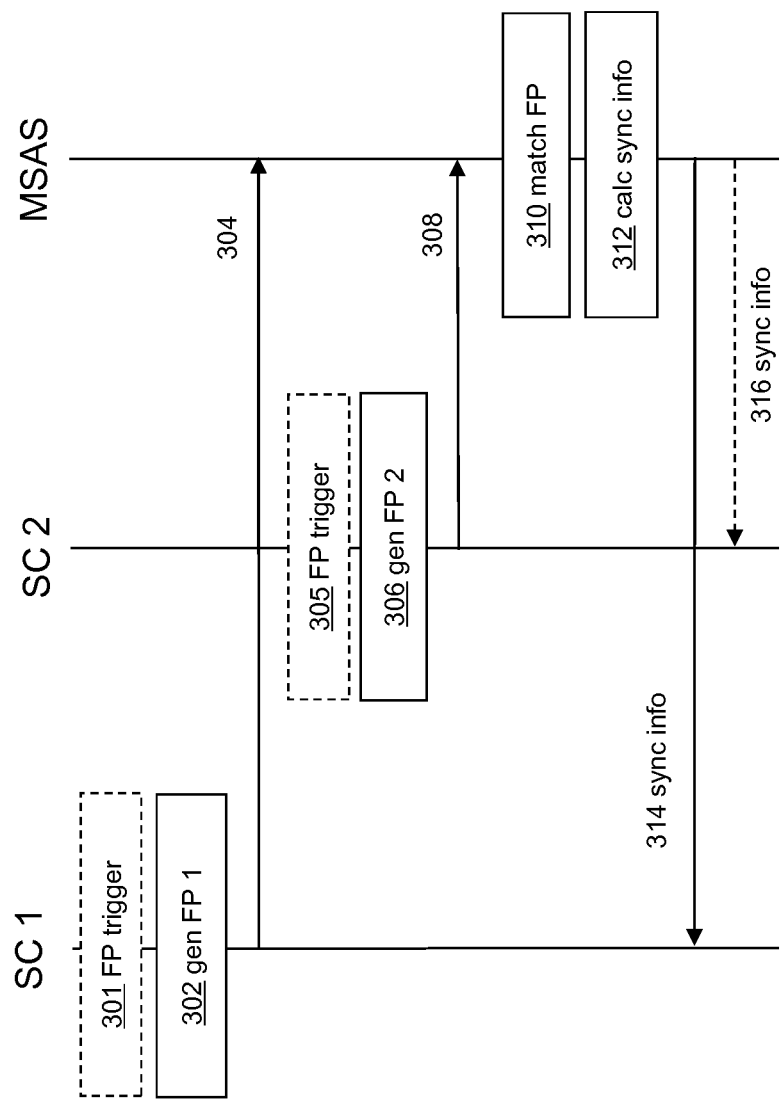
FIG. 3 depicts a schematic of an inter-destination synchronization process according to various embodiments of the disclosure.

FIG. 3 depicts an illustrative flow diagram of an inter-destination synchronization process according to various embodiments of the disclosure. In particular, FIG. 3 depicts a flow diagram of fingerprint-based IDMS processes for use in a system as described with reference to FIGS. 2A and 2B. The process depicted in FIG. 3 may start with a fingerprint generator in a first receiver generating at least one first fingerprint on the basis of at least part of a first content part (e.g. (part of) a video frame and/or one or more audio samples) (step 302). A synchronization client SC1 may use the first fingerprint to generate first timing information for an MSAS wherein the first fingerprint is used as a first content identifier for identifying a first content part in a first media stream received by the first receiver.

In one embodiment, the first timing information may further comprise a first clock time associated with a particular processing step of the first content part in the first receiver (e.g. reception, decoding, play-out, etc.). The first clock time may be generated by an (NTP) synchronized wall clock in the first receiver. In another embodiment (in case where the synchronization clients communicate with the MSAS using a low-delay communication channel as described above with reference to FIG. 2A) the first timing information may only comprise a fingerprint.

After the generation of the first timing information, the first synchronization client SC1 may provide the MSAS with the first timing information (step 304). In one embodiment, the first timing information may be provided to the MSAS by transmitting the timing information in a predetermined data format (e.g. synchronization status report) to the MSAS. In case the timing information only comprises a fingerprint, the MSAS may associate a first clock time to the first fingerprint upon reception of the first timing information.

Similarly, a second synchronization client in a second receiver may generate second timing information associated with a second content part in a second media stream received by the second receiver (step 306). The second timing information may comprise a second content identifier for identifying the second content part. In one embodiment, the content identifier may be defined in accordance with a protocol, which is used to transmit the content to the receiver. For example, when the content is transmitted using an RTP-based protocol, the second timing information may comprise a RTP time stamp to identify a content part. In another embodiment, the second content identifier may comprise a second fingerprint generated on the basis of at least part of a second content part. In an embodiment, the second content identifier may be associated with a second clock time using e.g. an (NTP) synchronized wall clock in the second receiver.

After generation of the second timing information, the MSAS may be provided with the second timing information (step 308). In one embodiment, the second timing information may be provided to the MSAS by transmitting it in a predetermined data format (e.g. second synchronization status report) to the MSAS.

After having received the first and second timing information, the matching algorithm in the MSAS may use the reported timing information in order to associate the content parts identified in the timing information with play-out times corresponding to positions on the play-out timeline of the content. At least one of these positions may be determined by matching a fingerprint in the timing information with one or more reference fingerprints, which is stored as reference information in a reference database (step 310). Here, the reference fingerprints are associated with reference positions of content parts on the play-out timeline of said content (step 312).

In one embodiment, the reference information may comprise reference fingerprints ordered in accordance with the play-out timeline of the content. Such reference information can be used when all or at least a substantial part of the receivers report timing information comprising fingerprints to the MSAS. In another embodiment, in addition to the reference fingerprints, the reference information may further comprise reference content identifiers which are defined in accordance with a predetermined transport or streaming protocol and which are ordered in accordance with the play-out timeline of the content. Such reference information can be used when one apart of the receivers report timing information on the basis of fingerprints and another part of the receivers report timing information on the basis of content identifiers as defined in accordance with a transport or streaming protocol (e.g. RTP time stamps as defined in the RPT protocol).

It is noticed that fingerprints of the same content part may not always be identical even though the same fingerprinting algorithm is used. If the content has been changed in some way, e.g. transcoded, cropped, changed in resolution, etc., the fingerprints associated with the same content part will be similar but not exactly equal. Hence, when executing a matching process, the matching algorithm searches for substantially similar fingerprints by comparing fingerprints and determining a (dis)similarity value on the basis of this comparison. A first fingerprint may substantially match a second fingerprint, e.g. a reference fingerprint, if the (dis)similarity value is below or above a certain threshold value. An example of such process is described in more detail with reference to FIG. 8.

If the matching algorithm determines a match between reported and reference fingerprints, it may determine a timing difference $\Delta t$ as described in detail with reference to FIGS. 2A and 2B. On the basis of the timing differences, synchronization information may be calculated (step 312) and sent to at least one the first or second synchronization clients (step 314,316), which may use this information to adjust the play-out of the content. This way synchronization of the play-out of the receivers can be obtained.

The synchronization process may be implemented such that the synchronization client reports on all or at least a large part of the content parts in the media stream.

Alternatively and/or in addition, in a further embodiment, the synchronization clients may comprise an algorithm, which is configured to select content parts for reporting to the MSAS. Several implementations of such algorithm may be possible.

In one embodiment, the synchronization clients may comprise an algorithm for triggering the generation of a fingerprint and provisioning of timing information comprising at least one fingerprint to the MSAS (steps 301 and 305 in FIG. 3). In one implementation, such algorithm may be configured to generate a fingerprint trigger signal on the first content part after a predetermined scene change. For this purpose, known scene-change detection algorithms as for example described by Chung-Lin Huang et al., "A Robust Scene-Change Detection Method for Video Segmentation", IEEE transaction on circuits and systems for video technology vol. 11, No. 12, December 2001, may be used. Because the receivers execute this scene-change detection algorithm on the same content, such algorithm may provide a robust solution for detecting the same scene changes and makes the same mistakes (false positives and false negatives) in doing so. This solution is especially effective for content wherein the frequency of predetermined scene changes is moderate: i.e. not too low so that adequate synchronization can be achieved and not too high so that there is sufficient time to allow the IDMS system to process the timing and synchronization information.

In another embodiment, the SC may comprise a fingerprint-reporting algorithm for determining whether or not to report a fingerprint to the MSAS on the basis of the fingerprints themselves. For example, if a certain condition is met, the fingerprint-reporting algorithm may determine that a synchronization client should report timing information comprising a fingerprint. For example, in one embodiment, a fingerprint may be represented as a series bits with binary values 1 and 0, i.e. a number of bits, so that the algorithm may determine that if the amount of "1" is above a certain threshold, the fingerprint should be reported. A fingerprint of the same content part at different receivers will be approximately similar so, most of the time, different synchronization clients reporting on the same content and using the same algorithm and threshold, will thus report on the same content parts. This may be sufficient to achieve synchronization up to a certain level of accuracy.

When using a fingerprint triggering or fingerprint-reporting algorithm as described above, the MSAS knows that the timing information transmitted by the different receivers to the MSAS reports on the same scene change, and thus the same content part. A first reported fingerprint FP A may be used as reference information, i.e. a reference fingerprint, for the other, later second reported fingerprint FP B. The timing difference Δt may then be simply determined by calculating the difference between the two clock times Clk_B−Clk_A.

Figure 4:
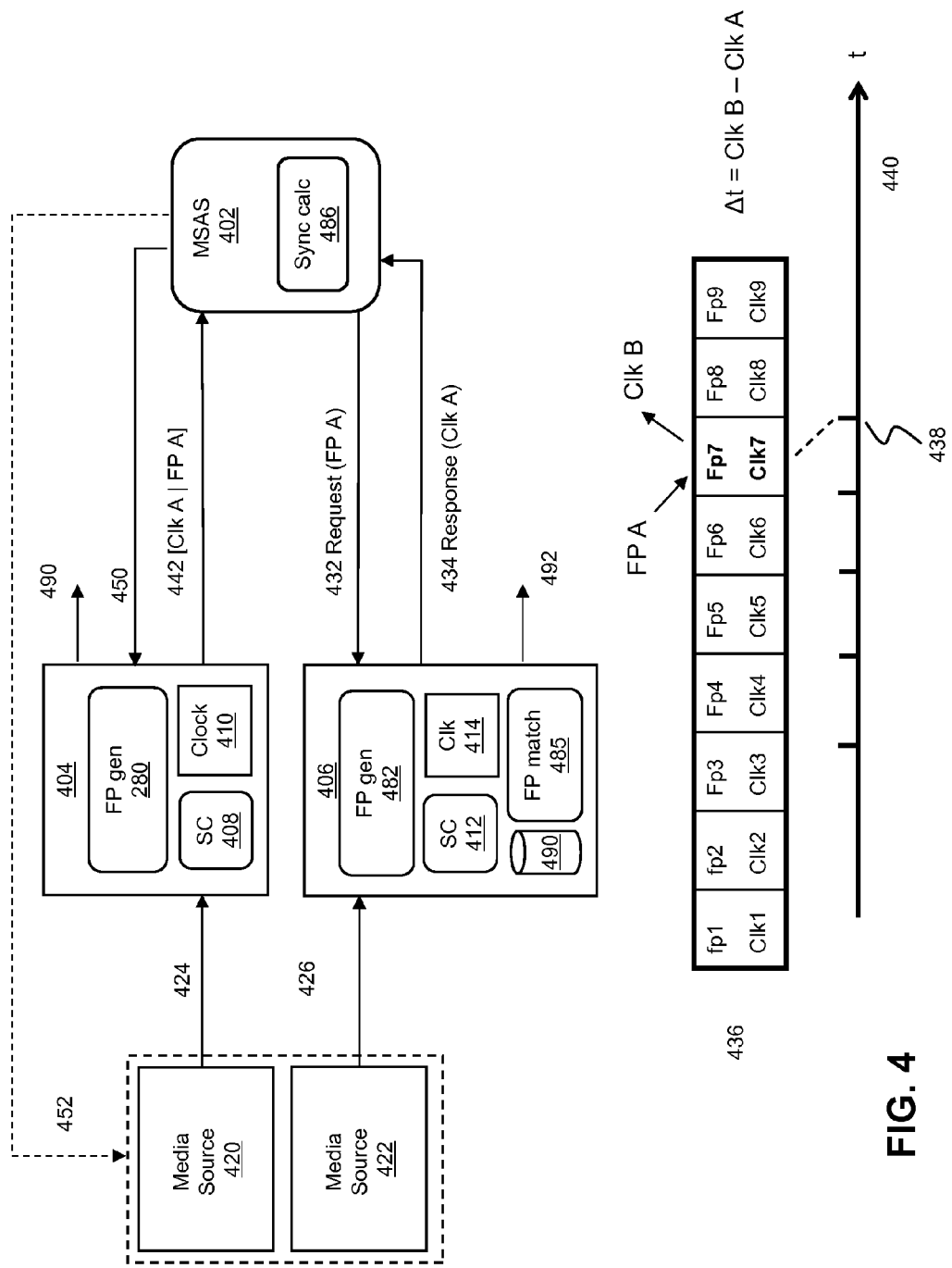
FIG. 4 depicts a fingerprint-based inter-destination media synchronization system according to an embodiment of the disclosure.

FIG. 4 depicts an exemplary fingerprint-based inter-destination media synchronization system according to another embodiment of the disclosure. In particular, similar to FIGS. 2A and 2B, FIG. 4 (I) depicts an IDMS system comprising one or more media sources, e.g., a first media source 420 and a second media source 422), a plurality of receivers, e.g. a first receiver 404 and a second receiver 406, and at least one media synchronization application server (MSAS) 402 comprising a synchronization algorithm 492. The first media source and the second media source may be configured to transmit the same (or substantially similar) content in a plurality of streams, e.g. a first media stream 424 and a second media stream 426, to the first and the second receiver, respectively. The first and second receiver may comprise a first and second synchronization client 408,412 respectively. In one embodiment, a receiver may comprise or be associated with a (e.g. NTP) synchronized wall clock 410,414 and a fingerprint generator 480,482, which is configured to produce a substantially unique fingerprint of a content part in the media stream received by the receiver. A synchronization client is configured to generate and transmit timing information 442 to the MSAS. The timing information may be transmitted in the form of a predetermined data structure, a report, to the MSAS comprising a synchronization algorithm 492.

In contrast with the IDMS system of FIGS. 2A and 2B, at least one of the receivers (in this case the second receiver 406) may comprise a fingerprint-matching algorithm 485 and a memory (cache) for storing a fingerprint database 490. Hence, in this embodiment, a receiver may be configured to receive a media stream and to generate a sequence of fingerprints on the basis of content parts in said media stream and to associate a content processing time, e.g. a play-out time, to the fingerprints.

As depicted in more detail in FIG. 4 (II), the fingerprints and associated content processing times may determine a play-out timeline 440 of the content and may be (temporarily) stored as reference information 436 in the reference database. The reference information may then be used by the fingerprint-matching algorithm for matching a fingerprint originating from other receiver with reference fingerprints in the reference database. This way the position of a content part (associated with a reported fingerprint) on the play-out timeline may be determined. Hence, in this particular embodiment, at least one receiver may store reference information wherein the reference information may be generated by the fingerprint generator in the receiver or, alternatively, provided in advance by e.g. a content provider, to the receiver. The advantages associated with such implementation are described hereunder in more detail.

The timing information 442 provided to the MSAS may comprise a fingerprint FP A and an associated clock time Clk A. The MSAS subsequently sends the fingerprint FPA in a fingerprint request message 432 to the receiver comprising the fingerprint-matching algorithm. Upon reception of the fingerprint request, the synchronization client 412 may execute the fingerprint-matching algorithm 485 using the reference fingerprints in the fingerprint database 490 of the receiver. In the example of FIG. 4, the reported fingerprint FP A may match reference fingerprint FP 7, which corresponds to a predetermined content processing clock time (in this example play-out time Clk 7). The synchronization client may send this clock time as Clk B in a response message back to the MSAS. On the basis of the reported clock times, the MSAS may calculate a timing difference Δt=Clk_B−Clk A, which is used by the synchronization algorithm 486 in the MSAS to determine synchronization information 450 for the synchronization client, which uses this information to adjust play-out.

In another embodiment, the MSAS may send synchronization information 452 to at least one of the media sources 420,422. On the basis of the synchronization information a source may adjust the transmission of a stream to a receiver so that synchronized processing of content parts is achieved. In yet another embodiment, the MSAS may transmit synchronization information both to at least one of the sources and a receiver.

Figure 5:
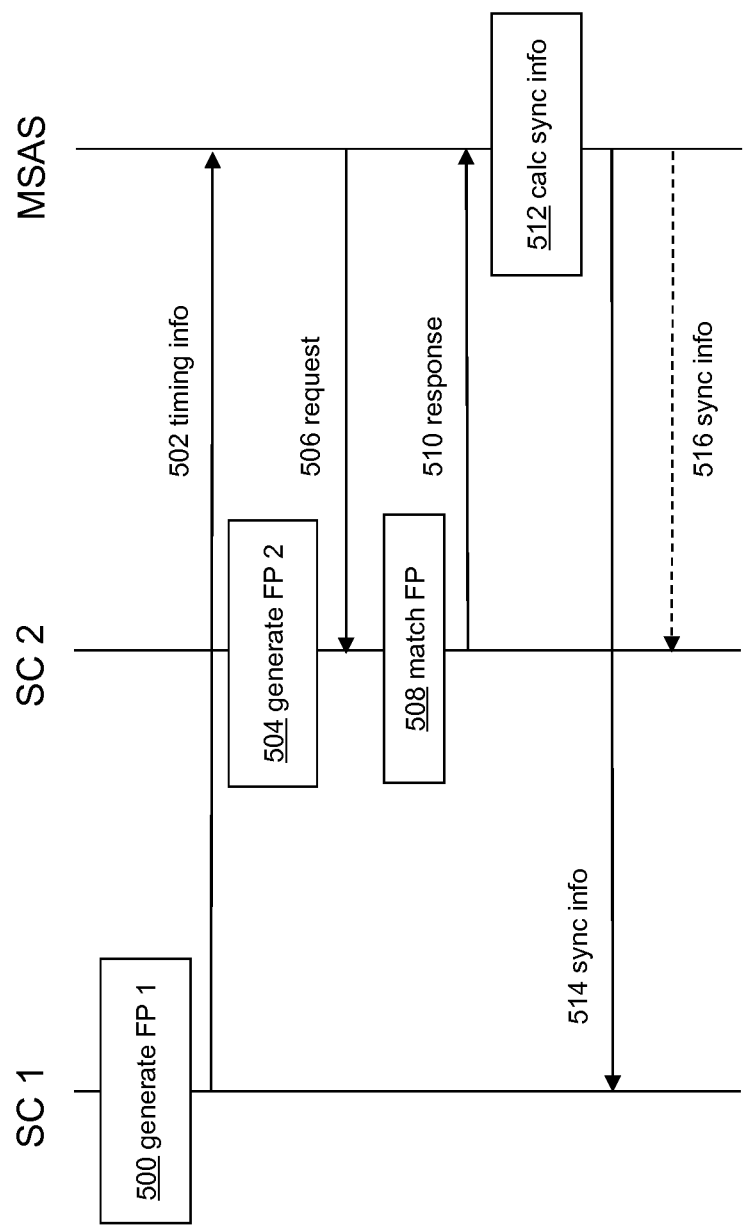
FIG. 5 depicts a schematic of an inter-destination synchronization process according to an embodiment of the disclosure.

FIG. 5 depicts a flow diagram of an inter-destination synchronization process according to various embodiments of the disclosure. In particular, FIG. 5 depicts a flow diagram of a fingerprint-based IDMS process for use in a system as described with reference to FIG. 4. In this system, a first receiver comprising a first synchronization client SC1 and a second receiver comprising a second synchronization client SC2 may receive the same (or substantially similar) content which may transmitted by a first content source in a first media stream to the first receiver and a second content source in a second media stream to the second receiver.

The process depicted in FIG. 5 may start with a first synchronization client SC1 generating first timing information comprising at least one first fingerprint and associated first clock time (FP_A, Clk_A) associated with a first content part (at least part of a video frame and/or audio sample) using a fingerprint generator in a first receiver (step 502). Further, the second synchronization client SC2 may generate second timing information comprising second fingerprints and associated clock times, e.g. play-out times, determined on the basis of second content parts in the second media stream (step 504). These one or more second fingerprints and associated timestamps may be stored as reference information in a reference database in the second receiver as explained in detail with reference to FIG. 4.

Then, in response to the reception of the first timing information originating from SC1, the MSAS may send a first request message for second timing information to the second synchronization client SC2, wherein the request message may comprise the first reported fingerprint FP A originating from SC1. When the second synchronization client SC2 receives the request message, a fingerprint-matching algorithm is executed wherein the first fingerprint (or part thereof) is matched against the stored reference fingerprints in the reference database in the second receiver (step 508).

When a matching reference fingerprint is found, an associated clock time Clk_B associated with the reference fingerprint is sent as a response message comprising second timing information back to the MSAS (step 510). The synchronization algorithm in the MSAS then simply determines the timing difference by calculating the difference between the two clock times: Clk_B−Clk_A and sending synchronization information for adjustment of the play-out of a receiver (or alternatively both receivers) (steps 514, 516).

This embodiment advantageously enables synchronization clients to report on the same part of the content without having to report on substantially all content parts (e.g. video frames and/or audio samples) in the media stream and/or without having to agree in advance on which content parts in the media stream should be reported. Further, this embodiment allows a third-party IDMS service because it does not use the MSAS to maintain reference information for that content.

Figure 6:
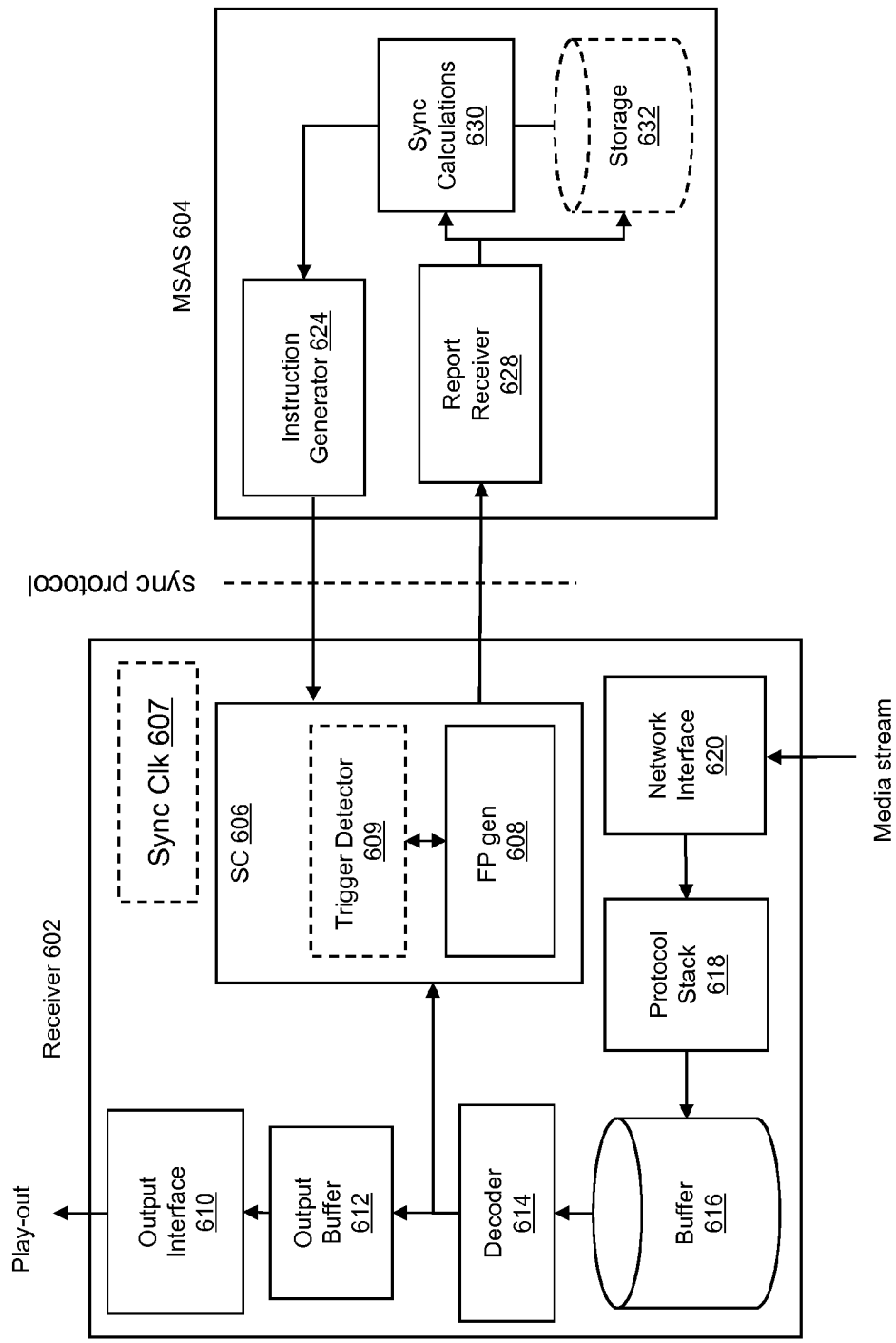
FIG. 6 depicts a schematic of at least part of an IDMS system, according to one embodiment of the disclosure.

FIG. 6 shows an illustrative system diagram of an exemplary receiver and MSAS, according to one embodiment of the disclosure. In particular, FIG. 6 depicts a receiver 602 comprising a synchronization client 606 configured to communicate with a MSAS 604. The receiver may comprise a media streaming client 620 comprising a network interface configured to receive content, e.g. a packetized stream, from one or more content sources in the network. The received packets of a media stream are passed on to a depacketizing unit 618 for depacketizing received packets in accordance with the particular protocol stack associated with the media stream. For example, it may depacketize packets in accordance with in various packet formats, e.g. TS/RTP/UDP/IP, TS/UDP/IP. During the depacketization process, e.g. encoded video frames and audio samples in the payload of the packets may be extracted and stored in the buffer 616 and packet header information may be extracted and used as control data which may be used by the various packet processing functions in the receiver.

The buffer is typically used to deal with jitter such that delays in the arrival of packets do not immediately affect the play-out of the samples (e.g., performs a smoothing function). Furthermore, the buffer (or a separate buffer) may be used to buffer packets for a decoder in a case where packets do not arrive in order (e.g., interpolated video encoding).

A decoder 614 receives encoded media samples from the buffer and decodes the media samples using an appropriate decoding algorithm. After decoding, the decoded media samples are provided to an output buffer 612 (e.g., a display buffer) to ensure jitter does not appear when the samples are outputted to the user. The decoded media samples are then sent via an output interface 610 to an output device (e.g., a display or a speaker).

In certain embodiments, decoded samples of the content are provided to fingerprint generator 608 to generate a fingerprint. The fingerprint generator may generate a fingerprint using a suitable algorithm on the basis of at least one media sample (e.g., audio sample, video sample, etc.). Details relating to the algorithms used by the fingerprint generator are discussed with reference to FIGS. 2-4. The fingerprint generator may be implemented in a synchronization client 606 or may be implemented at least partially outside of the synchronization client.

In some embodiments, an algorithm may be used to trigger when a fingerprint should be generated (e.g., via the use of a marker in the sample or in the header of a packet). Those implementations may have a trigger detector 609 for detecting such a marker. For instance, the trigger detector may implement a scene change algorithm (e.g., where the video content changes scene). Upon detecting a scene change in the content, the trigger detector may trigger a fingerprint to be generated by the fingerprint generator, causing a report to be transmitted on that fingerprint.

In certain embodiments, the trigger detector detects a certain trigger, which is based on the generated fingerprints. For instance, the trigger detector may determine whether a generated fingerprint meets one or more trigger criteria. If the one or more trigger criteria are met, then the trigger detector triggers a report to be generated on the basis of the generated fingerprint (i.e., the fingerprint that met the trigger criteria). For instance, the synchronization client may apply a rule on the generated fingerprints (e.g., by comparing the number of "1's" in a generated fingerprint against a threshold value) to determine whether a report should be transmitted to the MSAS.

To generate the report, the generated fingerprint may be linked to a clock time. The clock time may be associated with the receipt time when the decoded media sample was received. For this purpose, the receiver may include a synchronized clock 607. The fingerprint and corresponding clock time (timestamp) are then sent by the synchronization client to the MSAS.

Different clock times may be used with different advantages and disadvantages. For instance, the synchronization client may use a packet receipt time (i.e., the clock time when the media packet is received) as a clock time. Packet receipt times are convenient to use, but using them does not account for variable delays, which may occur between the receipt of the packet and the presentation of the content in the packet. If the (variable) delays are known, then the synchronization client may be able to account for the known (variable) delays by adjusting the receipt time.

In another instance, the synchronization client may use a packet presentation time (i.e., the clock time associated with the presentation of the media packet to the user via the output device). In one embodiment, the synchronization client may use a clock time associated with the moment when the fingerprint generator receives the decoded media sample. If the fingerprint is determined based on the output of the decoder, that particular clock time would be sufficiently close to the presentation time, assuming that delay caused by the output buffer and the output interface is relatively low. If multiple media streams are sent, e.g., for audio, video, subtitles, etc., separate buffers and decoders may be used for the various media streams.

The MSAS processes the synchronization status report received from the synchronization client of the receiver at a report receiver 628 (e.g., via a network interface, not shown). The report receiver may store reports temporarily (e.g., in a storage) because not all status reports from all synchronization clients would arrive at the same time. In some embodiments, the report receiver may include a fingerprint matcher for determining whether the received synchronization status reports include substantially the same fingerprint or correspond to the same part of the media content. Details relating to the fingerprint matching are explained in relation to FIGS. 3A, 3B and 5.

Reports from all, or at least a substantial part of the synchronization clients in a synchronization group (that have been temporarily stored) are then provided to the synchronization calculations module 630 to calculate adjustments, e.g., delays in the play-out times. Details relating to the methods applied in the synchronization calculation module are descried with reference to FIGS. 3A and 3B. Based on the synchronization calculations, instruction generator 624 may generate an appropriate synchronization settings instruction to be transmitted to the synchronization client (or other synchronization clients in the synchronization group).

Figure 7:
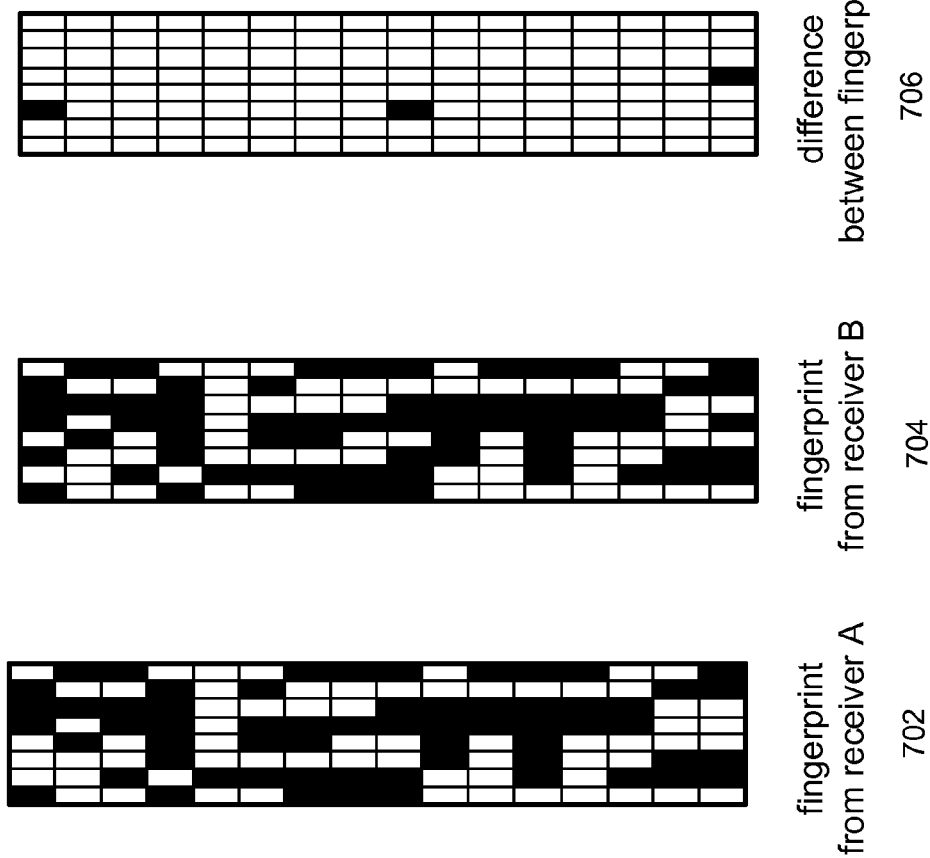
FIG. 7 depicts the process of matching video fingerprints, according to one embodiment of the disclosure.

FIG. 7 depicts a process of comparing two fingerprints. As already described above with reference to FIG. 2, fingerprints in different streams related to the same content part may not be necessarily exactly equal, even though the same fingerprinting algorithm is used by the receivers. If the content has been changed in some way or if it is influenced by noise or bit errors during transport, e.g., been transcoded, cropped, changed in resolution, suffered from packet loss, etc., the fingerprints of the same part of the content may be similar but not exactly equal. Accordingly, fingerprint comparison to determine fingerprint correspondence may include using finding a close enough match given a threshold.

In FIG. 7 schematics of two fingerprints are provided, a first fingerprint 702 from receivers A and a second fingerprint 704 from receiver B are matched by determining the difference between the two fingerprints. As shown in FIG. 7, the first fingerprint may differ from the second fingerprint received from receiver B by 3 bits. If the threshold is 5 bits, then the two fingerprints are considered to be associated with the same part of the content. If the threshold is 2 bits, then the two fingerprints are considered to not be associated with the same part of the content. The threshold may depend on the type of application and/or the fingerprint algorithm.

Figures 8A, 8B:
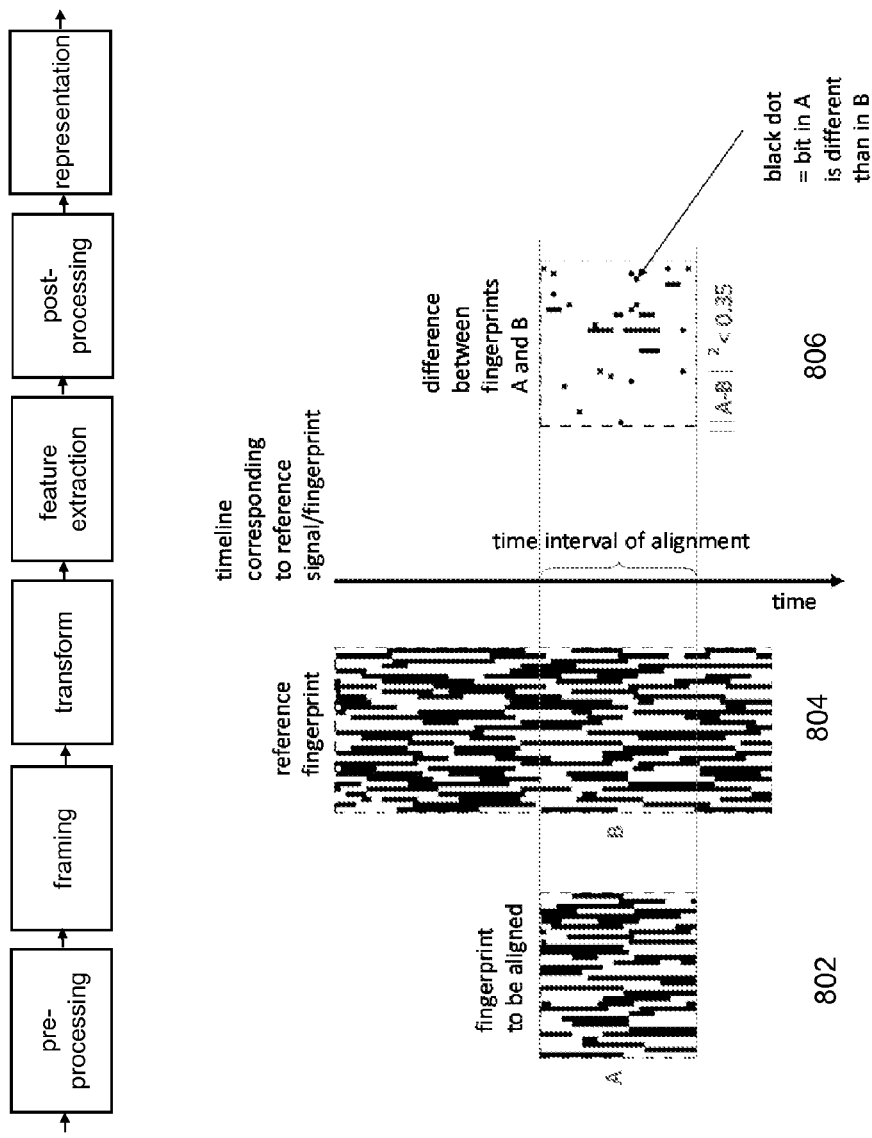
FIGS. 8A and 8B depict the process of matching audio fingerprints, according to one embodiment of the disclosure.

FIGS. 8A and 8B depict the process of generating audio fingerprints and matching an audio fingerprint with a reference audio fingerprint. Audio fingerprinting typically consists of two stages: 1) fingerprint extraction or generation, wherein an audio fingerprint is computed on the basis of an audio signal; and, 2) fingerprint matching, wherein two audio fingerprints are matched wherein the outcome of the matching is a numerical value indicating the level of (dis) similarity between the two fingerprints.

FIG. 8A depicts a fingerprint extraction process which comprises a step of pre-processing of the audio data (step 802). For example, the audio signal may be converted to a standard representation, e.g. a down-sampled mono signal, e.g. a 5.5 kHz mono-signal.

Further, the fingerprint extraction process may include a step of forming audio frames (step 804). In one embodiment, an audio signal may be divided into frames (a time series of audio samples), which may overlap each other. Each frame may be have a duration on the order of tens to hundreds of milliseconds, and frames may overlap each other by 50% or more. For instance, audio samples may be divided into frames having a predetermined duration, e.g. 371 milliseconds, and each frame may a certain overlap, e.g. 11.6 milliseconds (96%).

The fingerprint generation process may further comprise a step of transforming the audio input, e.g., audio frames, to the frequency domain (step 806) resulting in a time-frequency decomposition. Typical transforms include: Fast Fourier Transform (FFT), Modulated Complex Lapped Transform (MCLT), and Modulated Discrete Cosine Transform (MDCT). An audio fingerprint may also be computed in the time domain, however such time-domain features may be less robust and discriminating when compared with frequency-domain computed fingerprints.

The fingerprint generation process may further comprise a step of extracting features from the audio signal, e.g. the time-frequency decomposed audio signal (step 808). The features characterize the audio signal, which enables the audio fingerprint to have a high discriminating capability. Exemplary features may include: spectral energy, location of significant spectral peaks, Mel Frequency Cepstral Coefficients (MFCCs), Spectral Flatness Measure (SFL), Spectral Crest Factor (SCF).

In certain embodiments, further processing may be applied to enhance the discriminating, robustness properties, and/or size of the fingerprint (step 810). Typical post-processing includes: Principle Component Analysis, Oriented Principle Component Analysis, differential features, and quantization.

Finally, the fingerprint generation process may further comprise formatting the resulting processed signal into an audio fingerprint of a suitable representation (step 812). Here, fingerprint representations may include: a time-series, a vector, a statistical distribution such as a GMM, Hidden Markov Model. For accurate time alignment, the elements of the fingerprint preferably have a strict timing relation with the underlying audio signal.

In an example of the above-described audio fingerprint process it may include a pre-processing step of down-sampling the audio signal to mono signal, sampled at 5.5 kHz. A framing process wherein audio frames are generated of frame length of 371 ms and overlap of 11.6 ms (96%) and subjecting each audio frame to Fast Fourier Transform. Thereafter, feature extraction and post-processing may be applied to the transformed audio data, including the steps of:

Division of the audio spectrum between 300-2000 Hz into 33 non-overlapping frequency bands with exponentially increasing bandwidth.
  Computation of the average spectral energy in each frequency band
  Computation of a difference between energies in neighboring frequency bands within the same frame and the preceding frame.
  Representation of the sign of the energy difference in one bit (e.g., positive="1", negative="0"). The fingerprint of an audio signal now consists of a binary time-series.

In the above fingerprinting scheme, the fingerprint is a time-series of which the size (length) is determined by the duration of the input audio signal. Hence, in case of a continuous audio stream, the fingerprint may have the form of a stream as well.

Audio fingerprint matching involves matching a query fingerprint with a reference fingerprint. In FIG. 8B, an example query fingerprint, a reference fingerprint, and a difference between the two are shown. Alignment between the fingerprints may be found by comparing the query fingerprint at different temporal positions. The achievable alignment accuracy may depend on the time interval between two consecutive frames and the frame length and overlap (especially when a spectral transform is used). These factors affect how unique the content of the fingerprint is at a given time. If this is not unique enough, two fingerprints might match not only at the exact spot of alignment, but also a margin before and after. For instance, a fingerprinting scheme having an overlap of 11.6 milliseconds may, the maximum alignment accuracy is +/−11.6 milliseconds.

Figure 9:
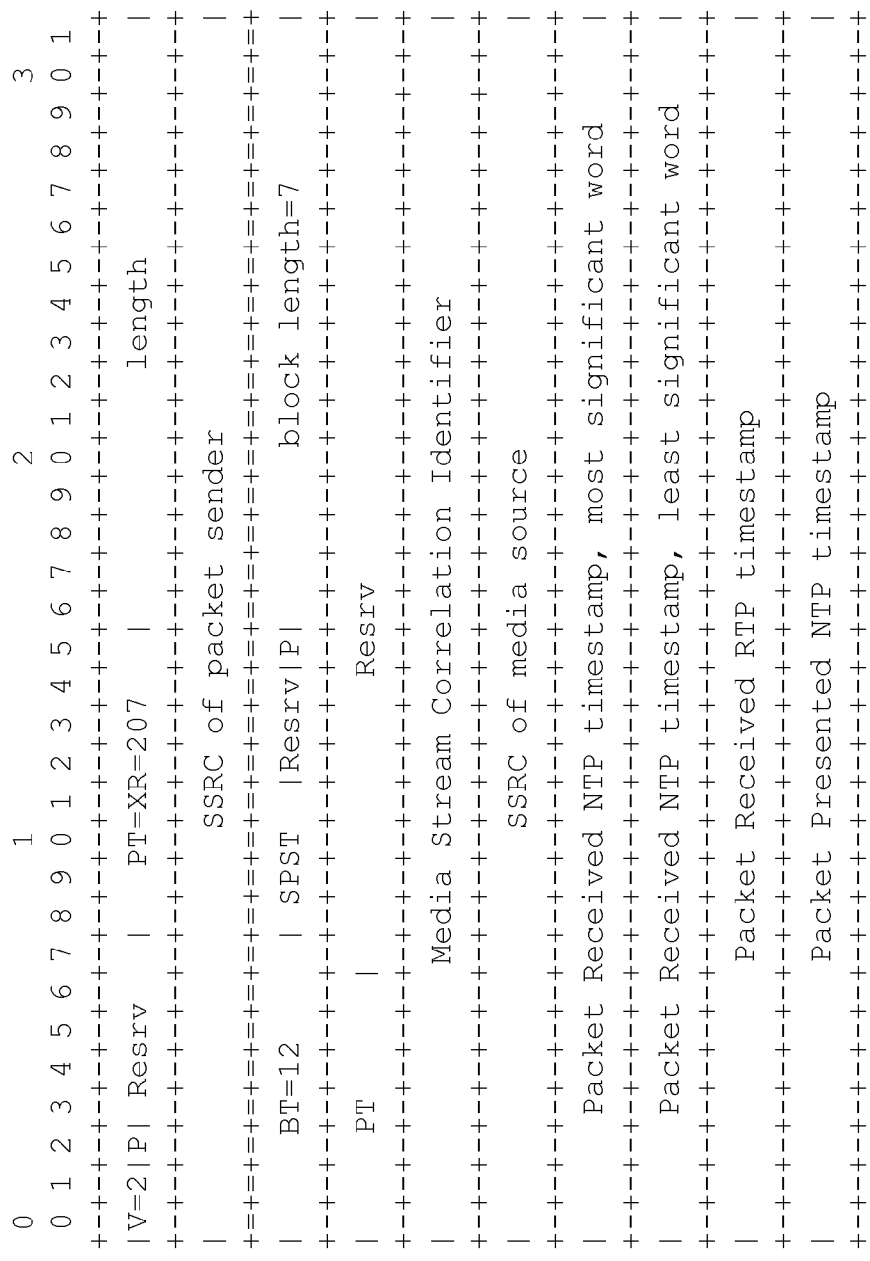
FIG. 9 depicts a conventional synchronization status report.

FIG. 9 depicts a conventional synchronization status report for reporting timing information to an MSAS. In particular, FIG. 9 depicts an RTCP XR Block type for inter-destination synchronization, as specified by ETSI TISPAN in TS 183 063 Annex W. The synchronization status report may comprise timing information, e.g. a NTP timestamp associated with the receipt time of an RTP packet and the RTP timestamp associated with the RTP packet. Optionally, the report may also comprise an NTP timestamp associated with the presentation time of the RTP packet. Such synchronization status report may be generated by the synchronization client and comprise timing information associated with a particular RTP packet comprising a particular content part.

Figure 10:
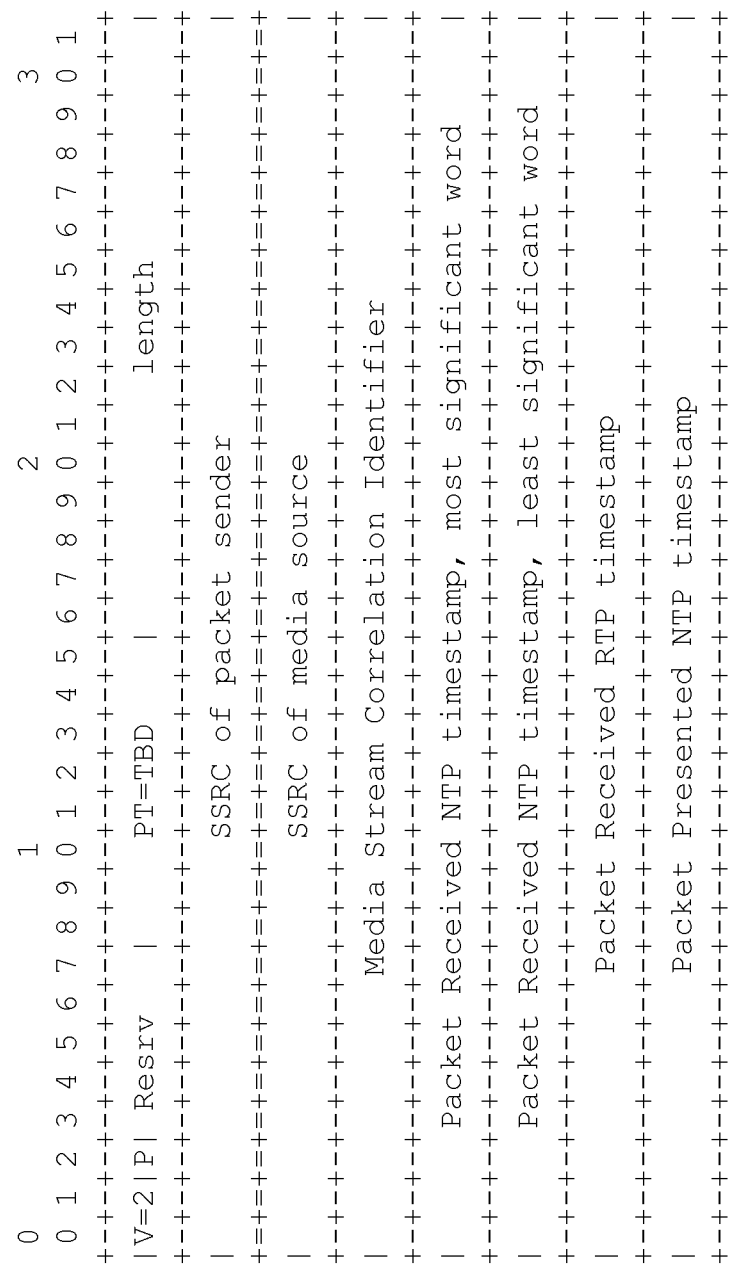
FIG. 10 depicts a data structure of a conventional IDMS report.

FIG. 10 shows the data structure of a conventional IDMS report for reporting synchronization information to a synchronization client. In particular, FIG. 10 depicts the data structure of an RTCP IDMS report as described in the IETF AVTCORE WG in the Internet Draft on IDMS. The RTCP IDMS report may include a NTP timestamp associated with the receipt time of an RTP packet, the RTP timestamp, and a NTP timestamp associated with the presentation time of the RTP packet. The receiver may use these data to match its play-out (e.g. to the most delayed receiver in the synchronization group).

Figure 11:
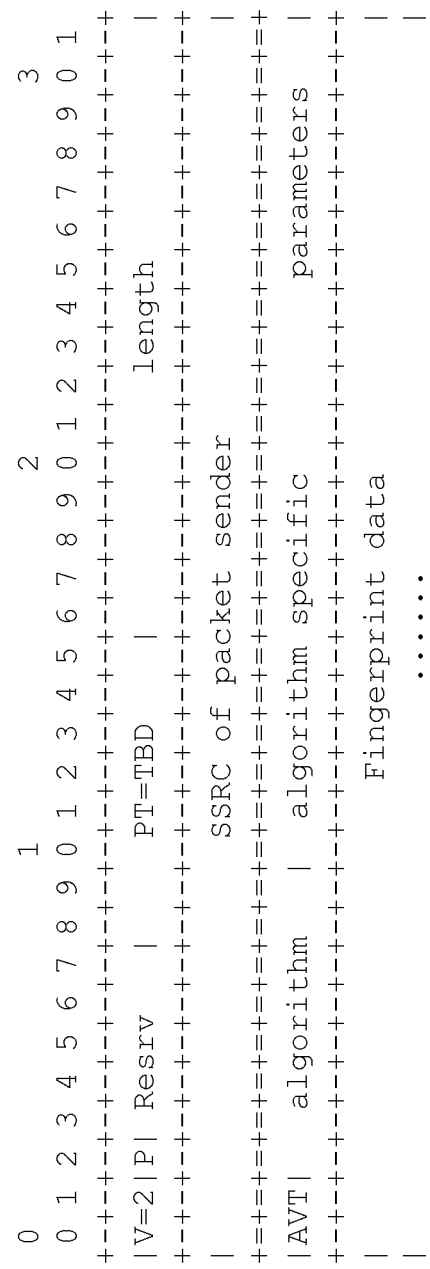
FIG. 11 depicts a data structure of at least part of an RTCP XR report, according to one embodiment of the disclosure.

FIG. 11 shows an exemplary data structure of at least part of an RTCPXRreport, according to one embodiment of the disclosure. In particular, FIG. 11 shows a data structure defining a new RTCP XR block comprising fingerprint information. Such XR block may be referred to as a fingerprint XR block and may be appended to a conventional synchronization status report or an IDMS report (as depicted in FIGS. 9 and 10). Here, the fingerprint information may include metadata (e.g. parameters) associated with the fingerprint algorithm and one or more fingerprints associated with e.g., one or more video frames, audio samples and/or text subtitle frames.

The fingerprint specific fields may be defined as follows. An AVT field (a two bits field) may specify if the reports comprises an audio, video or text fingerprint. For example, "00" may define an audio fingerprint, "01" may define a video fingerprint and "10" may define a text fingerprint. Further an algorithm field (e.g. an 8 bit field) may be used to specify the algorithm used. Here, each algorithm may be identified by unique identification code within these 8 bits, thus allowing 256 different algorithms in total. The remaining bits in the third 32 bit word may be used as a parameter field for algorithm specific parameters. In one embodiment, the payload of the report block may be formed by at least part of fingerprint. Finally, the length parameter field in the first 32 bit word of the report block may carry a value indicating the length of the fingerprint. This allows for a variable length of the fingerprints that can be carried in this report.

Figure 12:
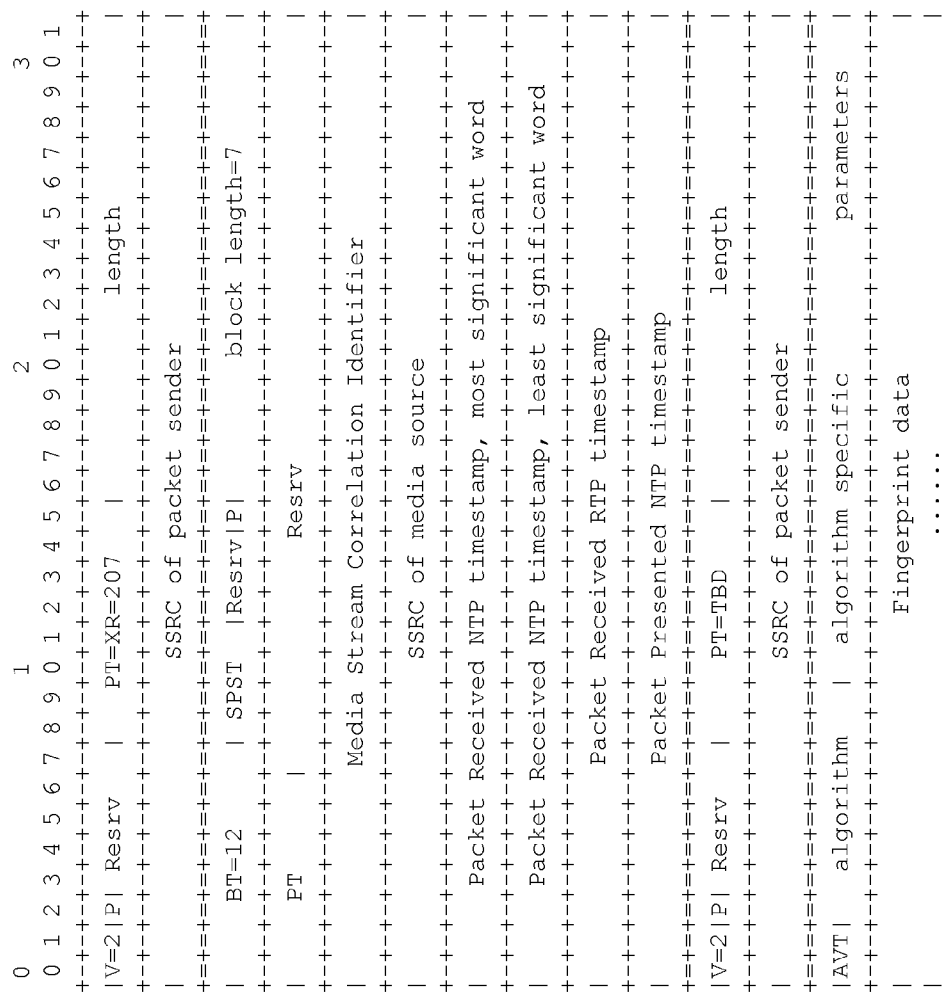
FIG. 12 shows a data structure of a RTCP synchronization status report according one embodiment of the disclosure.

FIG. 12 shows a data structure of a RTCP synchronization status report (as e.g. described in FIG. 9) combined with an RTCP fingerprint XR block comprising fingerprint information according to one embodiment of the disclosure. Appending the fingerprint XR report block to the synchronization status report block, signals the MSAS that the fingerprint information relates to the content part carried in an RTP packet as indicated in the RTCP synchronization status report.

Various exemplary Session Description Protocol (SDP) parameters may be used for negotiating the use of fingerprinting for IDMS, including which algorithm to use, which parameters to use, which media type to apply it to, and possibly which selection criteria to apply in the detection of triggers is used by a synchronization client to control the generation of fingerprints and/or reports.

FIGS. 13A-13C depict schematics of an IDMS system, according to various embodiments of the disclosure. Here, the MSAS may be implemented as a function configured for providing inter-destination synchronization to a plurality of synchronization clients in a synchronization group.

FIG. 13A depicts a first embodiment wherein the MSAS 1310 is at least partially implemented in a media source 1308. Further, receivers 1302, 1304 may exchange timing information and synchronization information with MSAS. This embodiment is particular advantageous in the case the media source generates fingerprints for storage in a fingerprint repository (as described e.g. with reference to FIG. 2). FIG. 13B, depicts a second embodiment wherein the MSAS 1314 is at least partially implemented in a receiver 1316. This way, the communication between the synchronization client and the MSAS is internal to the receiver. Furthermore, in this particular embodiment, the MSAS may have access to all fingerprints, because the receiver receives the entire content and thus may calculate and store all fingerprints.

FIG. 13C depicts a third embodiment wherein the MSAS 1330 is configured as a stand-alone server (as e.g. discussed with reference to FIG. 2). This way, the MSAS may be configured as a third-party MSAS, especially when implemented in accordance to the IMDM system as described with reference to FIG. 5, wherein the MSAS is not used to maintain a sequence of fingerprints for the content in a fingerprint database.

With some modifications, one skilled in the art may extend the embodiments described herein to other architectures, networks, or technologies. For instance, the disclosure here relates generally to the synchronization maestro scheme, where all receivers send their status reports to a master. This master determines the synchronization settings instruction needed for IDMS and transmits the synchronization settings to the appropriate receivers. However, the disclosed methods and systems may also be used (or adapted) to other schemes. In one instance, a master-slave receiver scheme may be used. One receiver (the master receiver) may send its synchronization status reports to all other receivers (the slave receivers). The other receivers then adjust the play-out according to those synchronization reports. In another instance, a distributed control scheme maybe used, where all receivers exchange synchronization status reports and each receiver determine based on all the received status reports how to adjust its own play-out.

One embodiment of the disclosure may be implemented as a program product for use with a computer system. The program(s) of the program product define functions of the embodiments (including the methods described herein) and can be contained on a variety of computer-readable storage media. The computer-readable storage media can be a non-transitory storage medium. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the disclosure is not limited to the embodiments described above, which may be varied within the scope of the accompanying claims.

The invention claimed is:

1. A method for enabling inter-destination synchronization of processing content parts in a first receiver comprising a first clock and second receiver comprising a second clock, said content parts being associated with a predetermined play-out timeline, said method comprising:

in said first receiver, determining first timing information comprising one or more first content part identifiers and associated first processing clock times generated by said first clock, a first content part identifier comprising one or more first fingerprints for identifying a first content part in a first media stream provided to said first receiver;

in said second receiver, determining second timing information comprising one or more second content part identifiers and associated second processing clock times generated by said second clock, a second content part identifier identifying a second content part in a second media stream provided to said second receiver, wherein the first content part and the second content part are parts of a same content;

based on said first and second timing information, calculating a timing difference in the processing of a content part in said first and second media streams, wherein calculating said timing difference comprises matching at least one of said one or more first fingerprints with reference information comprising one or more reference fingerprints associated with reference positions on said play-out timeline; and based on said timing difference, generating synchronization information for enabling adjustment of the processing of said first and/or second media streams so that inter destination synchronization between said first and second media streams is achieved.

2. The method according to claim 1, wherein said one or more second content part identifiers are defined in accordance with a protocol used for providing said second content parts to said second receiver.

3. The method according to claim 1, wherein said one or more second content part identifiers comprise one or more second fingerprints and wherein calculating said timing difference further comprises matching at least one of said one or more second fingerprints with said one or more reference fingerprints in said reference information.

4. The method according to claim 1, wherein at least part of said one or more second content part identifiers and associated second processing clock times are used as said reference information.

5. The method according to claim 4, further comprising:
generating one or more second fingerprints based on one or more content parts in said second media stream;
generating one or more processing clock times associated with said one or more second fingerprints, a second processing clock time indicating a time at which a second content part is processed by said second receiver; and
storing at least part of said one or more second fingerprints and one or more second processing clock times as reference information in a reference database in said second receiver.

6. The method according to claim 1, further comprising:
a first synchronization client in said first receiver transmitting said first timing information to a synchronization server;
said synchronization server transmitting a request for a processing clock time to a second synchronization client in said second receiver, said request comprising at least one of said one or more first fingerprints;
said second synchronization client transmitting a response to said synchronization server, said response comprising a second processing clock time associated with a reference fingerprint which matches said first fingerprint to said synchronization server; and
said synchronization server determining a timing difference in the processing of a content part in said first and second media streams based on said first and second processing clock times.

7. The method according to claim 1, wherein said first and/or second timing information is generated upon reception of a trigger signal in one or more content parts provided in said first and second media streams to said first and second receivers.

8. The method according to claim 1, said matching comprising:

comparing a first sequence of binary values associated with at least part of one of said first fingerprints with sequences of binary values associated with said one or more reference fingerprints.

9. The method according to claim 1, wherein said first timing information, said first timestamp, and/or said first fingerprint are transmitted in an RTCP synchronization status report.

10. A computer program product, stored in a non-transitory computer-readable storage medium, the computer program product configured for, when run on a computer, executing the method of claim 1.

11. A receiver configured to process and play-out content parts in a media stream, comprising:
an inter-destination synchronization client comprising software and hardware configured to execute functions, the functions including:
determining timing information comprising one or more first content part identifiers and associated first processing clock times, a first content part identifier comprising one or more first fingerprints for identifying one or more first content parts in said media stream, wherein each of the one or more first content parts are part of the same content;
transmitting said timing information to a synchronization server; and, optionally,
receiving synchronization information for adjusting said play-out of said content parts; and
a clock for generating a processing clock time associated with the processing by said receiver of at least one content part in said media stream.

12. The receiver according to claim 11, further comprising:
a fingerprint generator for generating one or more fingerprints based on at least part of one or more content parts in said media stream; and
a storage storing at least part of said one or more fingerprints.

13. The receiver according to claim 11, further comprising:
a communication interface for transmitting timing information to a synchronization server and for receiving synchronization information from said synchronization server.

14. The receiver according to claim 11, further comprising:
a data structure, comprising:
one or more content part identifiers and associated processing clock times, wherein at least one of said one or more content part identifiers comprise one or more first fingerprints for identifying one or more first content parts in a media stream.

15. The receiver according to claim 11, wherein the inter-destination synchronization client further comprises:
a data structure, comprising:
one or more content part identifiers and associated processing clock times, wherein at least one of said one or more content part identifiers comprise one or more first fingerprints for identifying one or more first content parts in a media stream.

16. A synchronization server for enabling inter-destination synchronization of processing content parts in a first receiver comprising a first clock and a second receiver comprising a second clock, said content parts being associated with a predetermined play-out timeline, comprising one or more hardware components, wherein the synchronization server is configured for:

receiving first timing information comprising one or more first content part identifiers and associated first processing clock times generated by said first clock in said first receiver, a first content part identifier comprising one or more first fingerprints for identifying a first content part in a first media stream provided to said first receiver;

receiving second timing information comprising one or more second content part identifiers and associated second processing clock times generated by said second clock in said second receiver, a second content part identifier identifying a second content part in a second media stream provided to said second receiver, wherein the first content part and the second content part are parts of a same content;

based on said first and second timing information, calculating a timing difference in the processing of a content part in said first and second media streams, wherein calculating said timing difference comprises matching at least one of said one or more first fingerprints with reference information comprising one or more reference fingerprints associated with reference positions on said play-out timeline; and based on said timing difference, generating synchronization information for enabling adjustment of the processing of said first and/or second media streams so that inter-destination synchronization between said first and second media streams is achieved.

17. The synchronization server of claim 16, wherein said one or more second content part identifiers are defined in accordance with a protocol.

18. The synchronization server of claim 16, wherein said one or more second content part identifiers comprise one or more second fingerprints and wherein calculating said timing difference further comprises matching at least one of said one or more second fingerprints with said one or more reference fingerprints in said reference information.

19. The synchronization server of claim 16, wherein at least part of said one or more second content part identifiers and associated second processing clock times are used as said reference information.

20. The synchronization server of claim 16, wherein the synchronization server is further configured for:

transmitting a request for a processing clock time to said second receiver, said request comprising at least one of said one or more first fingerprints;

receiving a response from said second receiver, said response comprising a second processing clock time associated with a reference fingerprint which matches said first fingerprint; and determining a timing difference in the processing of a content part in said first and second media streams based on said first and second processing clock times.

* * * * *